United States Patent [19]
Emura

[11] Patent Number: 5,903,263
[45] Date of Patent: May 11, 1999

[54] VIDEO-ON-DEMAND SYSTEM CAPABLE OF PERFORMING A HIGH-SPEED PLAYBACK AT A CORRECT SPEED

[75] Inventor: Koichi Emura, Chiba, Japan

[73] Assignee: Matsushita Electric Industrial Co., Ltd., Osaka, Japan

[21] Appl. No.: 09/005,086

[22] Filed: Jan. 9, 1998

Related U.S. Application Data

[62] Division of application No. 08/715,870, Sep. 19, 1996.

[30] Foreign Application Priority Data

Dec. 1, 1995 [JP] Japan .................................. 7-314474
Jul. 17, 1996 [JP] Japan .................................. 8-205479

[51] Int. Cl.$^6$ .................................................. H04N 7/173
[52] U.S. Cl. ........................ 345/327; 395/200.49; 348/7; 348/12; 348/10
[58] Field of Search ............................. 348/6, 7, 10, 12, 348/13; 345/327, 328; 395/200, 200.3, 200.47, 200.48, 200.49, 200.36; 433/3.1, 6.2, 4.1, 6.1, 4.2, 5.1, 6.3; H04N 7/11, 7/173

[56] References Cited

U.S. PATENT DOCUMENTS

| | | | |
|---|---|---|---|
| 5,528,282 | 6/1996 | Voeten et al. | 348/7 |
| 5,610,841 | 3/1997 | Tanaka | 348/12 X |
| 5,732,217 | 3/1998 | Erunta | 395/200.49 |

*Primary Examiner*—Nathan Flynn
*Attorney, Agent, or Firm*—Pearne, Gordon, McCoy & Granger LLP

[57] ABSTRACT

A video server apparatus is provided with a stream control section which determines a keyframe readout interval and a keyframe playback interval that satisfy a playback speed designated by a terminal apparatus. The video server apparatus transmits data of the thus-determined keyframe playback interval to the terminal apparatus. The video server apparatus reads out keyframes of a stored bit stream from at the thus-determined keyframe readout interval, and transmits a stream including the read-out keyframes to the terminal apparatus. The terminal apparatus decodes and displays the transmitted stream at the received keyframe playback interval. This system can correctly perform a playback at an arbitrary speed that is designated by the terminal apparatus.

1 Claim, 22 Drawing Sheets

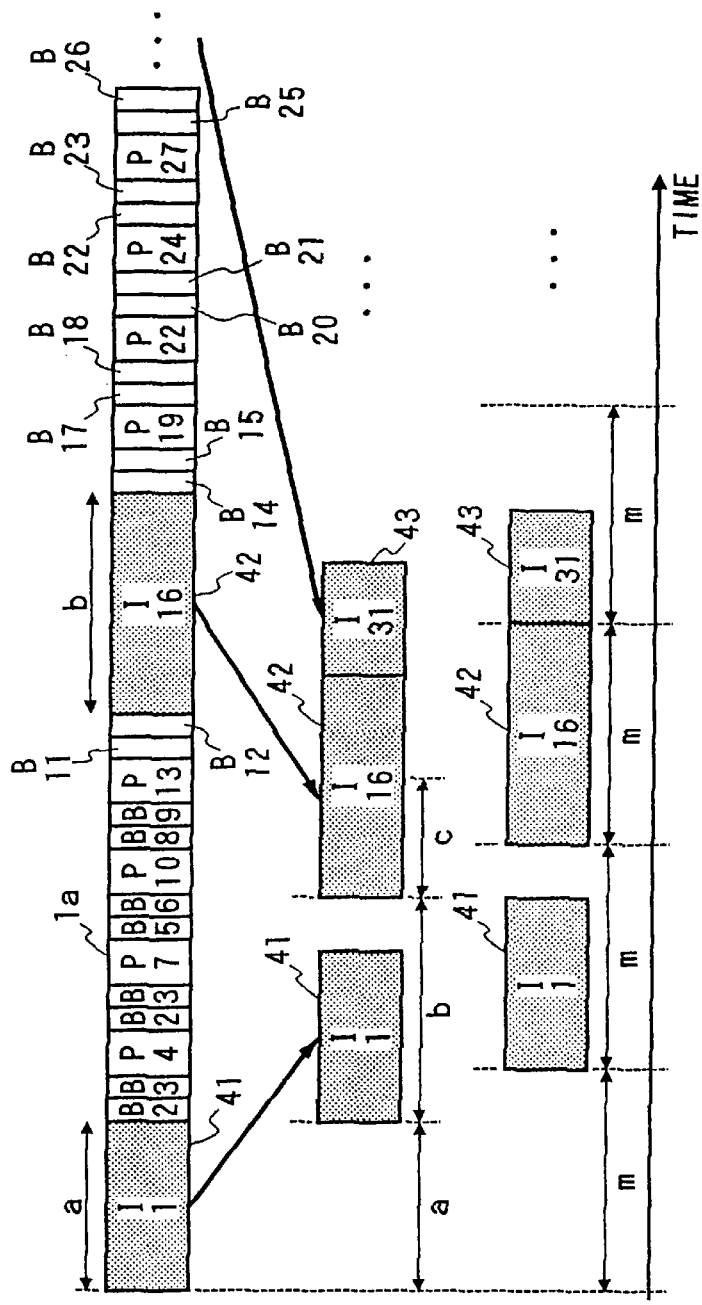

FIG. 9

| y/x | 15 | 30 | 45 | 60 | 75 | 90 | 105 | 120 | 135 | 150 | 165 | 180 |
|---|---|---|---|---|---|---|---|---|---|---|---|---|
| 1 | 15 | 30 | 45 | 60 | 75 | 90 | 105 | 120 | 135 | 150 | 165 | 180 |
| 2 | 7.5 | 15 | 22.5 | 30 | 37.5 | 45 | 52.5 | 60 | 67.5 | 75 | 82.5 | 90 |
| 3 | 5 | 10 | 15 | 20 | 25 | 30 | 35 | 40 | 45 | 50 | 55 | 60 |
| 4 | 3.75 | 7.5 | 11.3 | 15 | 18.8 | 22.5 | 26.3 | 30 | 33.8 | 37.5 | 41.3 | 45 |
| 5 | 3 | 6 | 9 | 12 | 15 | 18 | 21 | 24 | 27 | 30 | 33 | 36 |
| 6 | 2.5 | 5 | 7.5 | 10 | 12.5 | 15 | 17.5 | 20 | 22.5 | 25 | 27.5 | 30 |
| 7 | 2.14 | 4.29 | 6.43 | 8.57 | 10.7 | 12.9 | 15 | 17.1 | 19.3 | 21.4 | 23.6 | 25.7 |
| 8 | 1.88 | 3.75 | 5.63 | 7.5 | 9.38 | 11.3 | 13.1 | 15 | 16.9 | 18.8 | 20.6 | 22.5 |
| 9 | 1.67 | 3.33 | 5 | 6.67 | 8.33 | 10 | 11.7 | 13.3 | 15 | 16.7 | 18.3 | 20 |
| 10 | 1.5 | 3 | 4.5 | 6 | 7.5 | 9 | 10.5 | 12 | 13.5 | 15 | 16.5 | 18 |
| 11 | 1.36 | 2.73 | 4.09 | 5.45 | 6.82 | 8.18 | 9.55 | 10.9 | 12.3 | 13.6 | 15 | 16.4 |
| 12 | 1.25 | 2.5 | 3.75 | 5 | 6.25 | 7.5 | 8.75 | 10 | 11.3 | 12.5 | 13.8 | 15 |
| 13 | 1.15 | 2.31 | 3.46 | 4.62 | 5.77 | 6.92 | 8.08 | 9.23 | 10.4 | 11.5 | 12.7 | 13.8 |
| 14 | 1.07 | 2.14 | 3.21 | 4.29 | 5.36 | 6.43 | 7.5 | 8.57 | 9.64 | 10.7 | 11.8 | 12.9 |
| 15 | 1 | 2 | 3 | 4 | 5 | 6 | 7 | 8 | 9 | 10 | 11 | 12 |
| 16 | 0.94 | 1.88 | 2.81 | 3.75 | 4.69 | 5.63 | 6.56 | 7.5 | 8.44 | 9.38 | 10.3 | 11.3 |
| 17 | 0.88 | 1.76 | 2.65 | 3.53 | 4.41 | 5.29 | 6.18 | 7.06 | 7.94 | 8.82 | 9.71 | 10.6 |
| 18 | 0.83 | 1.67 | 2.5 | 3.33 | 4.17 | 5 | 5.83 | 6.67 | 7.5 | 8.33 | 9.17 | 10 |
| 19 | 0.79 | 1.58 | 2.37 | 3.16 | 3.95 | 4.74 | 5.53 | 6.32 | 7.11 | 7.89 | 8.68 | 9.47 |
| 20 | 0.75 | 1.5 | 2.25 | 3 | 3.75 | 4.5 | 5.25 | 6 | 6.75 | 7.5 | 8.25 | 9 |
| 21 | 0.71 | 1.43 | 2.14 | 2.86 | 3.57 | 4.29 | 5 | 5.71 | 6.43 | 7.14 | 7.86 | 8.57 |
| 22 | 0.68 | 1.36 | 2.05 | 2.73 | 3.41 | 4.09 | 4.77 | 5.45 | 6.14 | 6.82 | 7.5 | 8.18 |
| 23 | 0.65 | 1.3 | 1.96 | 2.61 | 3.26 | 3.91 | 4.57 | 5.22 | 5.87 | 6.52 | 7.17 | 7.83 | y: KEYFRAME PLAYBACK INTERVAL (FRAMES)
x: KEYFRAME READOUT INTERVAL (FRAMES)
MULTIPLICATION FACTOR

FIG. 15

| y\x | 15 | 30 | 45 | 60 | 75 | 90 | 105 | 120 | 135 | 150 | 165 | 180 |
|---|---|---|---|---|---|---|---|---|---|---|---|---|
| 1 | 15 | 30 | 45 | 60 | 75 | 90 | 105 | 120 | 135 | 150 | 165 | 180 |
| 2 | 7.5 | 15 | 22.5 | 30 | 37.5 | 45 | 52.5 | 60 | 67.5 | 75 | 82.5 | 90 |
| 3 | 5 | 10 | 15 | 20 | 25 | 30 | 35 | 40 | 45 | 50 | 55 | 60 |
| 4 | 3.75 | 7.5 | 11.3 | 15 | 18.8 | 22.5 | 26.3 | 30 | 33.8 | 37.5 | 41.3 | 45 |
| 5 | 3 | 6 | 9 | 12 | 15 | 18 | 21 | 24 | 27 | 30 | 33 | 36 |
| 6 | 2.5 | 5 | 7.5 | 10 | 12.5 | 15 | 17.5 | 20 | 22.5 | 25 | 27.5 | 30 |
| 7 | 2.14 | 4.29 | 6.43 | 8.57 | 10.7 | 12.9 | 15 | 17.1 | 19.3 | 21.4 | 23.6 | 25.7 |
| 8 | 1.88 | 3.75 | 5.63 | 7.5 | 9.38 | 11.3 | 13.1 | 15 | 16.9 | 18.8 | 20.6 | 22.5 |
| 9 | 1.67 | 3.33 | 5 | 6.67 | 8.33 | 10 | 11.7 | 13.3 | 15 | 16.7 | 18.3 | 20 |
| 10 | 1.5 | 3 | 4.5 | 6 | 7.5 | 9 | 10.5 | 12 | 13.5 | 15 | 16.5 | 18 |
| 11 | 1.36 | 2.73 | 4.09 | 5.45 | 6.82 | 8.18 | 9.55 | 10.9 | 12.3 | 13.6 | 15 | 16.4 |
| 12 | 1.25 | 2.5 | 3.75 | 5 | 6.25 | 7.5 | 8.75 | 10 | 11.3 | 12.5 | 13.8 | 15 |
| 13 | 1.15 | 2.31 | 3.46 | 4.62 | 5.77 | 6.92 | 8.08 | 9.23 | 10.4 | 11.5 | 12.7 | 13.8 |
| 14 | 1.07 | 2.14 | 3.21 | 4.29 | 5.36 | 6.43 | 7.5 | 8.57 | 9.64 | 10.7 | 11.8 | 12.9 |
| 15 | 1 | 2 | 3 | 4 | 5 | 6 | 7 | 8 | 9 | 10 | 11 | 12 |
| 16 | 0.94 | 1.88 | 2.81 | 3.75 | 4.69 | 5.63 | 6.56 | 7.5 | 8.44 | 9.38 | 10.3 | 11.3 |
| 17 | 0.88 | 1.76 | 2.65 | 3.53 | 4.41 | 5.29 | 6.18 | 7.06 | 7.94 | 8.82 | 9.71 | 10.6 |
| 18 | 0.83 | 1.67 | 2.5 | 3.33 | 4.17 | 5 | 5.83 | 6.67 | 7.5 | 8.33 | 9.17 | 10 |
| 19 | 0.79 | 1.58 | 2.37 | 3.16 | 3.95 | 4.74 | 5.53 | 6.32 | 7.11 | 7.89 | 8.68 | 9.47 |
| 20 | 0.75 | 1.5 | 2.25 | 3 | 3.75 | 4.5 | 5.25 | 6 | 6.75 | 7.5 | 8.25 | 9 |
| 21 | 0.71 | 1.43 | 2.14 | 2.86 | 3.57 | 4.29 | 5 | 5.71 | 6.43 | 7.14 | 7.86 | 8.57 |
| 22 | 0.68 | 1.36 | 2.05 | 2.73 | 3.41 | 4.09 | 4.77 | 5.45 | 6.14 | 6.82 | 7.5 | 8.18 |
| 23 | 0.65 | 1.3 | 1.96 | 2.61 | 3.26 | 3.91 | 4.57 | 5.22 | 5.87 | 6.52 | 7.17 | 7.83 | y: KEYFRAME PLAYBACK INTERVAL (FRAMES)
x: KEYFRAME READOUT INTERVAL (FRAMES)

MULTIPLICATION FACTOR

FIG. 17

| y \ x | 15 | 30 | 45 | 60 | 75 | 90 | 105 | 120 | 135 | 150 | 165 | 180 |
|---|---|---|---|---|---|---|---|---|---|---|---|---|
| 1 | 15 | 30 | 45 | 60 | 75 | 90 | 105 | 120 | 135 | 150 | 165 | 180 |
| 2 | 7.5 | 15 | 22.5 | 30 | 37.5 | 45 | 52.5 | 60 | 67.5 | 75 | 82.5 | 90 |
| 3 | 5 | 10 | 15 | 20 | 25 | 30 | 35 | 40 | 45 | 50 | 55 | 60 |
| 4 | 3.75 | 7.5 | 11.3 | 15 | 18.8 | 22.5 | 26.3 | 30 | 33.8 | 37.5 | 41.3 | 45 |
| 5 | 3 | 6 | 9 | 12 | 15 | 18 | 21 | 24 | 27 | 30 | 33 | 36 |
| 6 | 2.5 | 5 | 7.5 | 10 | 12.5 | 15 | 17.5 | 20 | 22.5 | 25 | 27.5 | 30 |
| 7 | 2.14 | 4.29 | 6.43 | 8.57 | 10.7 | 12.9 | 15 | 17.1 | 19.3 | 21.4 | 23.6 | 25.7 |
| 8 | 1.88 | 3.75 | 5.63 | 7.5 | 9.38 | 11.3 | 13.1 | 15 | 16.9 | 18.8 | 20.6 | 22.5 |
| 9 | 1.67 | 3.33 | 5 | 6.67 | 8.33 | 10 | 11.7 | 13.3 | 15 | 16.7 | 18.3 | 20 |
| 10 | 1.5 | 3 | 4.5 | 6 | 7.5 | 9 | 10.5 | 12 | 13.5 | 15 | 16.5 | 18 |
| 11 | 1.36 | 2.73 | 4.09 | 5.45 | 6.82 | 8.18 | 9.55 | 10.9 | 12.3 | 13.6 | 15 | 16.4 |
| 12 | 1.25 | 2.5 | 3.75 | 5 | 6.25 | 7.5 | 8.75 | 10 | 11.3 | 12.5 | 13.8 | 15 |
| 13 | 1.15 | 2.31 | 3.46 | 4.62 | 5.77 | 6.92 | 8.08 | 9.23 | 10.4 | 11.5 | 12.7 | 13.8 |
| 14 | 1.07 | 2.14 | 3.21 | 4.29 | 5.36 | 6.43 | 7.5 | 8.57 | 9.64 | 10.7 | 11.8 | 12.9 |
| 15 | 1 | 2 | 3 | 4 | 5 | 6 | 7 | 8 | 9 | 10 | 11 | 12 |
| 16 | 0.94 | 1.88 | 2.81 | 3.75 | 4.69 | 5.63 | 6.56 | 7.5 | 8.44 | 9.38 | 10.3 | 11.3 |
| 17 | 0.88 | 1.76 | 2.65 | 3.53 | 4.41 | 5.29 | 6.18 | 7.06 | 7.94 | 8.82 | 9.71 | 10.6 |
| 18 | 0.83 | 1.67 | 2.5 | 3.33 | 4.17 | 5 | 5.83 | 6.67 | 7.5 | 8.33 | 9.17 | 10 |
| 19 | 0.79 | 1.58 | 2.37 | 3.16 | 3.95 | 4.74 | 5.53 | 6.32 | 7.11 | 7.89 | 8.68 | 9.47 |
| 20 | 0.75 | 1.5 | 2.25 | 3 | 3.75 | 4.5 | 5.25 | 6 | 6.75 | 7.5 | 8.25 | 9 |
| 21 | 0.71 | 1.43 | 2.14 | 2.86 | 3.57 | 4.29 | 5 | 5.71 | 6.43 | 7.14 | 7.86 | 8.57 |
| 22 | 0.68 | 1.36 | 2.05 | 2.73 | 3.41 | 4.09 | 4.77 | 5.45 | 6.14 | 6.82 | 7.5 | 8.18 |
| 23 | 0.65 | 1.3 | 1.96 | 2.61 | 3.26 | 3.91 | 4.57 | 5.22 | 5.87 | 6.52 | 7.17 | 7.83 | y: KEYFRAME PLAYBACK INTERVAL (FRAMES)
x: KEYFRAME READOUT INTERVAL (FRAMES)

MULTIPLICATION FACTOR

| y\x | 15 | 30 | 45 | 60 | 75 | 90 | 105 | 120 | 135 | 150 | 165 | 180 |
|---|---|---|---|---|---|---|---|---|---|---|---|---|
| 1 | 15 | 30 | 45 | 60 | 75 | 90 | 105 | 120 | 135 | 150 | 165 | 180 |
| 2 | 7.5 | 15 | 22.5 | 30 | 37.5 | 45 | 52.5 | 60 | 67.5 | 75 | 82.5 | 90 |
| 3 | 5 | 10 | 15 | 20 | 25 | 30 | 35 | 40 | 45 | 50 | 55 | 60 |
| 4 | 3.75 | 7.5 | 11.3 | 15 | 18.8 | 22.5 | 26.3 | 30 | 33.8 | 37.5 | 41.3 | 45 |
| 5 | 3 | 6 | 9 | 12 | 15 | 18 | 21 | 24 | 27 | 30 | 33 | 36 |
| 6 | 2.5 | 5 | 7.5 | 10 | 12.5 | 15 | 17.5 | 20 | 22.5 | 25 | 27.5 | 30 |
| 7 | 2.14 | 4.29 | 6.43 | 8.57 | 10.7 | 12.9 | 15 | 17.1 | 19.3 | 21.4 | 23.6 | 25.7 |
| 8 | 1.88 | 3.75 | 5.63 | 7.5 | 9.38 | 11.3 | 13.1 | 15 | 16.9 | 18.8 | 20.6 | 22.5 |
| 9 | 1.67 | 3.33 | 5 | 6.67 | 8.33 | 10 | 11.7 | 13.3 | 15 | 16.7 | 18.3 | 20 |
| 10 | 1.5 | 3 | 4.5 | 6 | 7.5 | 9 | 10.5 | 12 | 13.5 | 15 | 16.5 | 18 |
| 11 | 1.36 | 2.73 | 4.09 | 5.45 | 6.82 | 8.18 | 9.55 | 10.9 | 12.3 | 13.6 | 15 | 16.4 |
| 12 | 1.25 | 2.5 | 3.75 | 5 | 6.25 | 7.5 | 8.75 | 10 | 11.3 | 12.5 | 13.8 | 15 |
| 13 | 1.15 | 2.31 | 3.46 | 4.62 | 5.77 | 6.92 | 8.08 | 9.23 | 10.4 | 11.5 | 12.7 | 13.8 |
| 14 | 1.07 | 2.14 | 3.21 | 4.29 | 5.36 | 6.43 | 7.5 | 8.57 | 9.64 | 10.7 | 11.8 | 12.9 |
| 15 | 1 | 2 | 3 | 4 | 5 | 6 | 7 | 8 | 9 | 10 | 11 | 12 |
| 16 | 0.94 | 1.88 | 2.81 | 3.75 | 4.69 | 5.63 | 6.56 | 7.5 | 8.44 | 9.38 | 10.3 | 11.3 |
| 17 | 0.88 | 1.76 | 2.65 | 3.53 | 4.41 | 5.29 | 6.18 | 7.06 | 7.94 | 8.82 | 9.71 | 10.6 |
| 18 | 0.83 | 1.67 | 2.5 | 3.33 | 4.17 | 5 | 5.83 | 6.67 | 7.5 | 8.33 | 9.17 | 10 |
| 19 | 0.79 | 1.58 | 2.37 | 3.16 | 3.95 | 4.74 | 5.53 | 6.32 | 7.11 | 7.89 | 8.68 | 9.47 |
| 20 | 0.75 | 1.5 | 2.25 | 3 | 3.75 | 4.5 | 5.25 | 6 | 6.75 | 7.5 | 8.25 | 9 |
| 21 | 0.71 | 1.43 | 2.14 | 2.86 | 3.57 | 4.29 | 5 | 5.71 | 6.43 | 7.14 | 7.86 | 8.57 |
| 22 | 0.68 | 1.36 | 2.05 | 2.73 | 3.41 | 4.09 | 4.77 | 5.45 | 6.14 | 6.82 | 7.5 | 8.18 |
| 23 | 0.65 | 1.3 | 1.96 | 2.61 | 3.26 | 3.91 | 4.57 | 5.22 | 5.87 | 6.52 | 7.17 | 7.83 | y: KEYFRAME PLAYBACK INTERVAL (FRAMES)
x: KEYFRAME READOUT INTERVAL (FRAMES)
MULTIPLICATION FACTOR

5,903,263

VIDEO-ON-DEMAND SYSTEM CAPABLE OF PERFORMING A HIGH-SPEED PLAYBACK AT A CORRECT SPEED

BACKGROUND OF THE INVENTION

This application is a division of application Ser. No. 08/715,870, filed Sep. 19, 1996.

1. Field of the Invention

The present invention relates to a video server apparatus capable of performing various kinds of special playbacks of coded moving images more smoothly.

The invention also relates to a video-on-demand system, a broadcasting system, a video library system, and the like which consist of a video server apparatus for storing moving image programs and terminal apparatuses for displaying images supplied from the video server, and particularly to a technique for enabling a high-speed playback of moving images at an arbitrary speed.

2. Description of the Related Art

A video server apparatus has entered a commercial stage which apparatus stores a number of compressed/coded moving image programs in a storage medium such as a hard disk and performs simultaneous, multiple playbacks of the same or different image programs in response to requests from a plurality of terminal apparatuses. A video-on-demand system has been realized by combining the above server apparatus and terminal apparatuses in which system the server apparatus immediately responds to individual program requests from terminal apparatuses. In museums etc., a video library system utilizing such a video-on-demand system is constructed to allow visitors to conduct in-house perusal. Further, CATV broadcasting system companies are now considering a service for providing, by utilizing a video-on-demand system, a movie that is selected by a user at his terminal apparatus. In this specification, all of the above systems are generally referred to as a "video-on-demand system."

In the above systems, not only a normal playback but also various kinds of special playbacks such as a fast-forward playback and a rewind playback are attracting great interest. For example, reference is made to Y. Ishibashi et al.: "Multiple-access Visual Search for Digital Video-on-demand Services," technical Report of IEICE, CS92-74, IE92-96, pp. 101–106, December 1992, and T. Mori et al.: "Video Storage and Visual Search techniques in VOD System," Technical Report of IEICE, IE94-81, pp. 9–16, November 1994.

A conventional video-on-demand system will be described below. FIG. 1 is a block diagram showing its configuration. In FIG. 1, a video server apparatus VS consists of a hard disk 1 as a storage medium, AV (audio-video) streams 1a, an access table 1b, a stream reading section 2; a stream transmitting section 3; an access table managing section 4; a command receiving section 5, and a stream control section 6. A terminal apparatus ST consists of a stream receiving section 7, a command transmitting section 8, a decoder section 9, and an input control section 10. A monitor 11, a speaker 12, and an input device 13 are connected to the terminal apparatus ST.

FIG. 2 is a block diagram showing details of the stream control section 6 of the above conventional video server apparatus VS. In FIG. 2, reference numeral 81 denotes a stream readout position determining section and numeral 82 denotes a keyframe skip number setting table.

FIG. 3A illustrates keyframe readout intervals of a high-speed playback in the above server apparatus. In FIG. 3A, reference numerals 41–43 denote keyframes that are read out first, second, and third, and characters a–c denote readout periods of the keyframes 41–43 (constant read bit rate).

FIG. 4A illustrates keyframe readout intervals of another type of high-speed playback in the above server apparatus. In FIG. 4A, reference character n means time taken to read out a storage unit block at a constant bit rate Reference numerals 51–53 denote keyframes that are read out first, second, and third, and symbols a'–c' denote readout periods of the keyframes 51–53 when they are read out at a constant bit rate on a storage unit block basis.

FIG. 5A illustrates the operation of the access table managing section 4 of the above server apparatus. In FIG. 5A, reference character u means time taken to read out the access table 1b at a constant bit rate.

FIG. 6A illustrates a frame storage order of an AV stream 1a, and FIG. 6B illustrates a frame playback order in a normal playback.

The above-configured video server apparatus operates in the following manner. A signal that is input from the input device 13 is converted by the input control section 10 into commands indicating a playback start position and a playback speed, which are transmitted from the command transmitting section 8 to the command receiving section 5. The stream control section 6 determines keyframes to be read out and their storage locations based on the playback start position and the playback speed that are received by the command receiving section 5 and keyframe addresses that are managed by the access table managing section 4, and gives the determined information to the stream reading section 2. More specifically, in the stream control section 6, the stream readout position determining section 81 determines keyframes to be read out based on the playback speed that is obtained from the command receiving section 5, the keyframe interval, and the coding bit rate of the AV stream 1a, and also determines readout positions of the AV stream 1a based on the playback start position that is obtained from the command receiving section 5 and keyframe addresses that are managed by the access table managing section 4. The determined information is sent to the stream reading section 2. The stream reading section 2 reads out the AV stream 1a at a designated read bit rate, and a read-out stream is transmitted from the stream transmitting section 3 to the stream receiving section 7. The stream received by the stream receiving section 7 is decoded by the decoder section 9, and output as images and sound from the monitor 11 and the speaker 12, respectively An AV stream 1a, which has been obtained by compressing/coding an audio-associated video signal according to the international standard MPEG (moving picture experts group), are stored in a frame order shown in FIG. 6A. In the case of a normal playback, the stream reading section 2 reads out all of the AV stream 1a, the stream transmitting section 3 transmits all of the read-out data, and the data are output from the monitor 11 in a frame order shown in FIG. 6B. In the case of a fast-forward or rewind playback, the stream reading section 2 reads out only keyframes, i.e., I frames, the stream transmitting section 3 transmits only the keyframes, and the keyframes are output from the monitor 11 in a frame order of FIG. 3A, FIG. 4A, or the like.

For convenience of description, frame types of I, P and B and display frame order numbers of a normal playback are indicated in FIGS. 3A, 4A and 6A. Frame type I corresponds to an intra-coded image that has been subjected to intraframe coding, frame type P corresponds to a forward prediction coded image that has been subjected to motion-compensation interframe coding, and frame type B corresponds to a bidirectional prediction coded image that has been subjected to motion-compensation interframe coding.

The access table 1b has descriptions of a head address of each I frame of an AV stream 1a, a data length of each I frame, a coding bit rate of the AV stream 1a, and other items, and is managed by the access table managing section 4.

However, the above conventional video server apparatus has a problem that where the data length of a keyframe varies stream by stream, a constant playback speed is not obtained in reading streams at a constant bit rate in a high-speed playback even if the same keyframe skip number is set.

The above conventional video server apparatus has another problem that where the data length of a keyframe varies in one stream, the time taken to read or transmit one keyframe varies in reading or transmitting a stream at a constant bit rate in a high-speed playback.

The above conventional video server apparatus has still another problem that where the data length of a keyframe varies in one stream, the time taken to read or transmit one keyframe varies in reading or transmitting a stream at a constant bit rate on a fixed-length block basis in a high-speed playback.

Further, in the above conventional video server apparatus, since the entire access table is acquired immediately before a playback at a constant bit rate, a response time from a stream playback request to a start of an actual playback of the requested stream is long.

FIG. 7 shows another conventional video-on-demand system. As shown in FIG. 7, a video server apparatus of this system consists of a hard disk 101 for storing a number of AV streams 101a, a hard disk 102 for storing an access table 102b to be used in accessing the AV streams 101a, a stream reading section 103 for reading out an AV stream 101a from the hard disk 101, a stream transmitting section 104 for transmitting the readout AV stream to a terminal apparatus, an access table managing section 105 for managing the access table 102b, a command receiving section 106 for receiving a command from the terminal apparatus, a stream control section 107 for controlling reading and transmission of the AV stream in response to a request from the terminal apparatus, and a keyframe skip number setting table 108 in which keyframe readout intervals of high-speed playbacks are set.

The terminal apparatus consists of an input control section 113 for generating a command in response to an input manipulation on an input device 116, a command transmitting section 109 for transmitting the generated command to the video server apparatus, a stream receiving section 110 for receiving an AV stream 101a from the video server apparatus, a decoder section 112 for decoding the received AV stream 101a, and a decoder control section 111 for controlling the decoding and playback timing of the decoder section 112. The input device 116 such as a keyboard or a mouse, a monitor 114 for displaying decoded images and a speaker 115 for outputting decoded sound are connected to the terminal apparatus.

In this video-on-demand system, a signal that is input through the input device 116 and indicates a designated program, a playback start position, a playback speed, etc. is converted by the input control section 113 into a program designation command and commands indicating a playback start position and a playback speed of moving images, which commands are transmitted from the command transmitting section 109 to the command receiving section 106 of the video server apparatus.

The stream control section 107 selects an AV stream 101a of the designated program from among a number of AV streams 101a stored in the hard disk 101 and determines the storage location of a keyframe located in the vicinity of the designated playback start position based on the program designation information, the playback start position, and the playback speed that have been received by the command receiving section 106, and keyframe information and a coding bit rate of the AV stream 101a which are managed by the access table managing section 105. The stream control section 107 further determines a read bit rate based on the coding bit rate etc. The stream control section 107 gives the thus-determined information to the stream reading section 103 and instructs it to start reading out the selected stream 101a.

In a normal playback, the stream control section 107 sets the read bit rate equal to the coding bit rate. In a high-speed playback, the stream control section 107 sets the read bit rate equal to or lower than the coding bit rate.

If the playback speed obtained from the command receiving section 106 means a high-speed playback, the stream control section 107 determines keyframes to be read out in the high-speed playback and a read bit rate based on the received playback speed, the relationship between the playback speed multiplication factor and the keyframe readout interval which is described in the keyframe skip number setting table 108, and the information managed by the access table managing section 105. The stream control section 107 then instructs the stream reading section 103 to read out the keyframes thus determined, and to add a playback mode indicating a change in playback speed to a read-out stream.

The stream reading section 103 reads out the designated keyframes from the AV stream 101a at the read bit rate that is designated by the stream control section 107, and inserts or buries a playback mode into the read-out stream that consists only of the keyframes.

The stream transmitting section 104 transmits the stream that is received from the stream reading section 103 to the stream receiving section 110 of the terminal apparatus. At this time, the stream control section 107 controls the transmission bit rate in accordance with the number of terminal apparatuses currently communicating with the video server apparatus and other information.

In the terminal apparatus, the decoder control section 111 controls the decoding and playback timing of the decoder section 112 by using, as a trigger, the playback mode extracted from the stream by the stream receiving section 110. Controlled in this manner, the decoder section 112 decodes the stream received by the stream receiving section 110. The decoded stream is output from the monitor 114 as images, and also output from the speaker 115 as sound in the case of a normal playback.

In the case of a normal playback, the entire AV stream 101a that is stored in the hard disk 101 in a frame order shown in FIG. 6A is read out by the stream reading section 103, and then transmitted by the stream transmitting section 104. The stream 101a is output from the monitor 114 in a frame order shown in FIG. 6B.

In the case of a high-speed playback, the stream reading section 103 reads out only the designated keyframes (i.e., I frames), the stream transmitting section 104 transmits the read-out keyframes, and the monitor 114 continues to display each of the transmitted I frames over a given period as shown in FIGS. 8A–8D. In FIGS. 8A–8D, solid-line frames are frames that are actually decoded and broken-line frames are frames that are a previously decoded frame which is kept displayed as it is. FIG. 8A shows a case where I frames are read out in the order of I(1), I(16), I(31), I(46), . . . (the parenthesized numbers indicate a display order of frames in a normal playback) and each of the I frames is displayed on the monitor 114 over a playback period of 9 frames. Similarly, FIG. 8B shows a case where I frames are read out in the order of I(1), I(31), I(61), I(91), . . . and each of the I frames is displayed on the monitor 114 over a playback period of 9 frames.

In the case of FIG. 8A, images that would have a frame interval of 15 frames in a normal playback are played back over a frame interval of 9 frames (images are updated every 9 frames). Therefore, the playback speed multiplication factor is 15/9=1.67. In the case of FIG. 8B, images that would have a frame interval of 30 frames in a normal playback are played back over a frame interval of 9 frames. Therefore, the playback speed multiplication factor is 30/9= 3.33.

FIG. 9 is a playback speed table showing a relationship between a playback speed multiplication factor and a combination of a keyframe readout interval and a keyframe playback interval. This table relates to a case where the keyframe interval, which is the number of frames existing between adjacent keyframes in a stream, is 15. The horizontal axis represents a keyframe readout interval x, that is, a frame interval between actually read-out keyframes of an AV stream 101$a$, and the vertical axis represents a keyframe playback interval y, that is, a frame interval during which the terminal apparatus continues to play back the same keyframe. A playback speed, which is calculated as x/y, is written at an intersection of x and y.

In the conventional video server apparatus, the keyframe skip number setting table 108 describes, in accordance with the system specification, a relationship corresponding to part of the playback speed table of FIG. 9, for instance, a relationship between the frame readout interval x and the playback speed multiplication number in a case where the keyframe playback interval is 9 (region 191 in FIG. 9).

When a playback speed of a multiplication factor 2, 3, 4 or 5 is designated by the terminal apparatus, the stream control section 107 of the video server apparatus selects a playback speed that is closest to the designated speed by referring to the relationship described in the keyframe skip number setting table 108, and determines a keyframe readout interval x that corresponds to the selected playback speed. In this example, when a double-speed playback is designated by the terminal apparatus, a keyframe readout interval x of 15 corresponding to a playback speed multiplication factor 1.67 is selected. When a triple-speed playback is designated, a keyframe readout interval x of 30 corresponding to a multiplication factor 3.33 is selected. When a quadruple-speed playback is designated, a keyframe readout interval x of 30 corresponding to a multiplication factor 3.33 is also selected. When a 5-fold-speed playback is designated, a keyframe readout interval x of 45 corresponding to a multiplication factor 5 is selected. The stream reading section 103 is so controlled as to read out I frames of the AV stream 101$a$ from the hard disk 101 at the keyframe readout interval x thus determined. In this example, the actual playback speed multiplication factors are 1.67, 3.33, 3.33 and 5 for the designated multiplication factors of 2, 3, 4 and 5, respectively.

According to the system specification, the terminal apparatus continues to display each keyframe that is transmitted from the video server apparatus while setting the keyframe playback interval y at 9. FIGS. 8A–8D show playback frame sequences in the terminal apparatus for designated playback speed multiplication factors of 2, 3, 4 and 5, respectively.

However, in the conventional video-on-demand system, even if an arbitrary playback speed multiplication factor is designated by the terminal apparatus, an actual playback is performed with a multiplication factor that is an approximation of the designated one. Further, there may occur an event that actual playbacks are performed at the same speed even for designated playback speeds that are different from each other, as in the case of triple-speed and quadruple-speed playbacks in the above example. As such, the actual playback speed cannot be controlled finely.

Further, there is a possibility that because the keyframe readout interval varies stream by stream, a designated playback speed cannot be attained without changing the keyframe playback interval. However, in this case, since the conventional system does not have any means for informing the terminal apparatus of a keyframe playback interval that has been determined for reasons on the video server apparatus side, the terminal apparatus cannot control the keyframe playback interval in accordance with the characteristics of a stream. As a result, a high-speed playback is performed at an improper speed.

SUMMARY OF THE INVENTION

A first object of the present invention is to provide a video server apparatus which can perform a high-speed playback at a playback speed requested from a terminal apparatus even if the keyframe data size varies stream by stream.

A second object of the invention is to provide a video server apparatus which can transmit frames at constant intervals in a high-speed playback even if the keyframe data size varies in one stream.

A third object of the invention is to provide a video server apparatus which can shorten a response time from a playback request from a terminal apparatus to a start of transmission of a stream irrespective of the size of an access table.

A fourth object of the invention is to provide a video-on-demand system which can perform a high-speed playback at a correct, arbitrary speed, as well as to provide a video server apparatus and a terminal apparatus constituting such a system.

According to a first aspect of the invention, there is provided a video server apparatus comprising stream storage means for storing compressed and coded streams; stream reading means for reading out one of the streams which is designated by a terminal apparatus; stream transmitting means for transmitting the read-out stream to the terminal apparatus; access table managing means for managing addresses of keyframes of the stream; keyframe data length calculating means for acquiring data lengths of the keyframes; and stream readout position determining means for determining a first keyframe located in the vicinity of a playback start position that is designated by the terminal apparatus based on the addresses managed by the access table managing means, informing the stream reading means of a readout position of the first keyframe, selecting keyframes to be extracted from the stream so as to satisfy an arbitrary playback speed that is designated by the terminal apparatus based on a bit rate at which the stream reading means reads out the stream, a coding bit rate and a keyframe interval of the stream, and the keyframe data lengths acquired by the keyframe data length calculating means, and informing the stream reading means of the selected keyframes. With this configuration, even if the keyframe data length varies stream by stream, a high-speed playback can be performed smoothly at a speed that is closest to an arbitrary playback speed requested by the terminal apparatus with a minimized variation in playback speed among streams.

Further, there is provided a video server apparatus comprising stream storage means for storing compressed and coded streams; stream reading means for reading out one of the streams which is designated by a terminal apparatus; stream transmitting means for transmitting the read-out stream to the terminal apparatus; access table managing means for managing addresses of keyframes of the stream; keyframe data length calculating means for acquiring data lengths of the keyframes; stream readout position determining means for determining a first keyframe located in the vicinity of a playback start position that is designated by the terminal apparatus based on the addresses managed by the access table managing means, selecting keyframes which satisfy an arbitrary playback speed that is designated by the terminal apparatus, and informing the stream reading means of readout positions of the first keyframe and the selected keyframes; and stream transmission timing setting means for controlling a transmission bit rate of the stream transmitting means and a read bit rate of the stream reading means so that the selected keyframes are transmitted at a constant interval, based on the keyframe data lengths acquired by the keyframe data length calculating means. With this configuration, even if the keyframe data length varies within one stream, keyframes are transmitted to the terminal apparatus at a constant interval in a high-speed playback of a designated, arbitrary speed. This enables a high-speed playback to be viewed more comfortably.

Still further, there is provided a video server apparatus comprising stream storage means for storing compressed and coded streams; access table storage means for storing an access table having pages which contain addresses of keyframes of the streams, each of the pages corresponding to an arbitrary data length or an arbitrary period; stream reading means for reading out one of the streams which is designated by a terminal apparatus; stream transmitting means for transmitting the read-out stream to the terminal apparatus; keyframe data length calculating means for acquiring data lengths of the keyframes; access table managing means for acquiring addresses of the keyframes from the access table storage means on a page-by-page basis; stream readout position determining means for determining a first keyframe located in the vicinity of a playback start position that is designated by the terminal apparatus based on the addresses acquired by the access table managing means, and informing the stream reading means of a readout position of the first keyframe; and access table page switching judgment means for judging whether to acquire a next page based on an address of a keyframe being read out by the stream reading means, and for instructing the access table managing means to acquire the next page based on a judgment result. With this configuration, a playback can be started before acquisition of addresses of all the keyframes. Therefore, a response time from a stream playback request to an actual start of a playback can be shortened.

According to a second aspect of the invention, there is provided a video-on-demand system comprising a video server apparatus for storing bit streams; a terminal apparatus for requesting the video server apparatus to transmit one of the bit streams; stream control means for determining, when only keyframes are read out from the bit stream in accordance with a playback speed designated by the terminal apparatus, a keyframe readout interval and a keyframe playback interval that satisfy the designated playback speed; means provided in the video server apparatus, for reading out the keyframes of the bit stream at the keyframe readout interval, and for transmitting a stream including the read-out keyframes to the terminal apparatus; and means provided in the terminal apparatus, for decoding and displaying the transmitted stream at the keyframe playback interval. This system can perform a playback at a correct speed that is equal to an arbitrary speed designated by the terminal apparatus.

The above video-on-demand system may be constructed such that the stream control means is provided in the video server apparatus, and that data of the keyframe playback interval determined by the stream control means is transmitted to the terminal apparatus.

The above video-on-demand system may further comprise control information transmitting and receiving means for sending the data of the keyframe playback interval from the video server apparatus to the terminal apparatus. In this configuration, data of the keyframe playback interval and a read-out stream are transmitted via separate routes.

The above video-on-demand system may further comprise means provided in the video server apparatus, for inserting the data of the keyframe playback interval into the stream to be transmitted to the terminal apparatus. This configuration allows the terminal apparatus to easily perform precise control of the keyframe playback interval.

The above video-on-demand system may be constructed such that the stream control means is provided in the terminal apparatus, and that data of the keyframe readout interval is transmitted to the video server apparatus. This configuration allows the terminal apparatus to perform precise control of the keyframe playback interval.

The above video-on-demand system may be constructed such that the stream control means determines employs, as the keyframe playback interval, a shortest one of integral multiples of a keyframe interval of the bit stream which are longer than a minimum keyframe playback interval that allows complete transmission of the keyframes, and employs, as the keyframe readout interval, a product of the keyframe playback interval and a multiplication factor of the designated playback speed.

The above video-on-demand system may be constructed such that the stream control means determines sets, as a basic keyframe playback interval, a shortest one of integral multiples of a keyframe interval of the bit stream which are longer than a minimum keyframe playback interval that allows complete transmission of the keyframes, employs, as the keyframe playback interval, a shortest one of intervals from the minimum keyframe playback interval to the basic keyframe playback interval, and employs, as the keyframe readout interval, a product of the keyframe playback interval and a multiplication factor of the designated playback speed. With this configuration, the quality of high-speed playback images can be improved by making the keyframe playback interval as short as possible.

The above video-on-demand system may be constructed such that the stream control means employs, as the keyframe readout interval, a shortest one of integral multiples of a keyframe interval of the bit stream which are longer than a product of a multiplication factor of the designated playback speed and a minimum keyframe playback interval that allows complete transmission of the keyframes, and employs, as a keyframe playback interval of an nth keyframe received by the terminal apparatus, an integer that is obtained by subtracting an integer that is closest to a value obtained by multiplying the keyframe readout interval by n−1 and then dividing a resulting product by the multiplication factor from a value obtained by multiplying the keyframe readout interval by n and then dividing a resulting product by the multiplication factor. With this configuration, a non-integral playback speed multiplication factor can be attained because the keyframe playback interval is determined for each keyframe.

The above video-on-demand system may be constructed such that the stream control means determines the keyframe readout interval and the keyframe playback interval that satisfy the designated playback speed of a forward or backward high-speed playback. With this configuration, a high-speed playback can be performed at a correct speed in either forward or backward direction.

BRIEF DESCRIPTION OF THE DRAWINGS

FIG. 3A illustrates keyframe readout intervals in a first-type of high-speed playback in the conventional video server apparatus of FIG. 1;

FIG. 3B illustrate keyframe readout intervals in the first type of high-speed playback in a video server apparatus according to a second embodiment of the present invention;

FIG. 9 is a playback speed table illustrating how a keyframe readout interval and a keyframe playback interval are determined in the conventional system of FIG. 7;

FIG. 15 is a playback speed table illustrating how a keyframe readout interval and a keyframe playback interval are determined in a video-on-demand-system according to a fifth embodiment of the invention;

FIG. 17 is a playback speed table illustrating how a keyframe readout interval and a keyframe playback interval are determined in a video-on-demand-system according to a sixth embodiment of the invention;

FIG. 19 is a playback speed table illustrating how a keyframe readout interval and a keyframe playback interval are determined in a video-on-demand-system according to a seventh embodiment of the invention;

DESCRIPTION OF THE PREFERRED EMBODIMENTS

Embodiments of the present invention will be hereinafter described with reference to the accompanying drawings.

Embodiment 1

Figure 1:
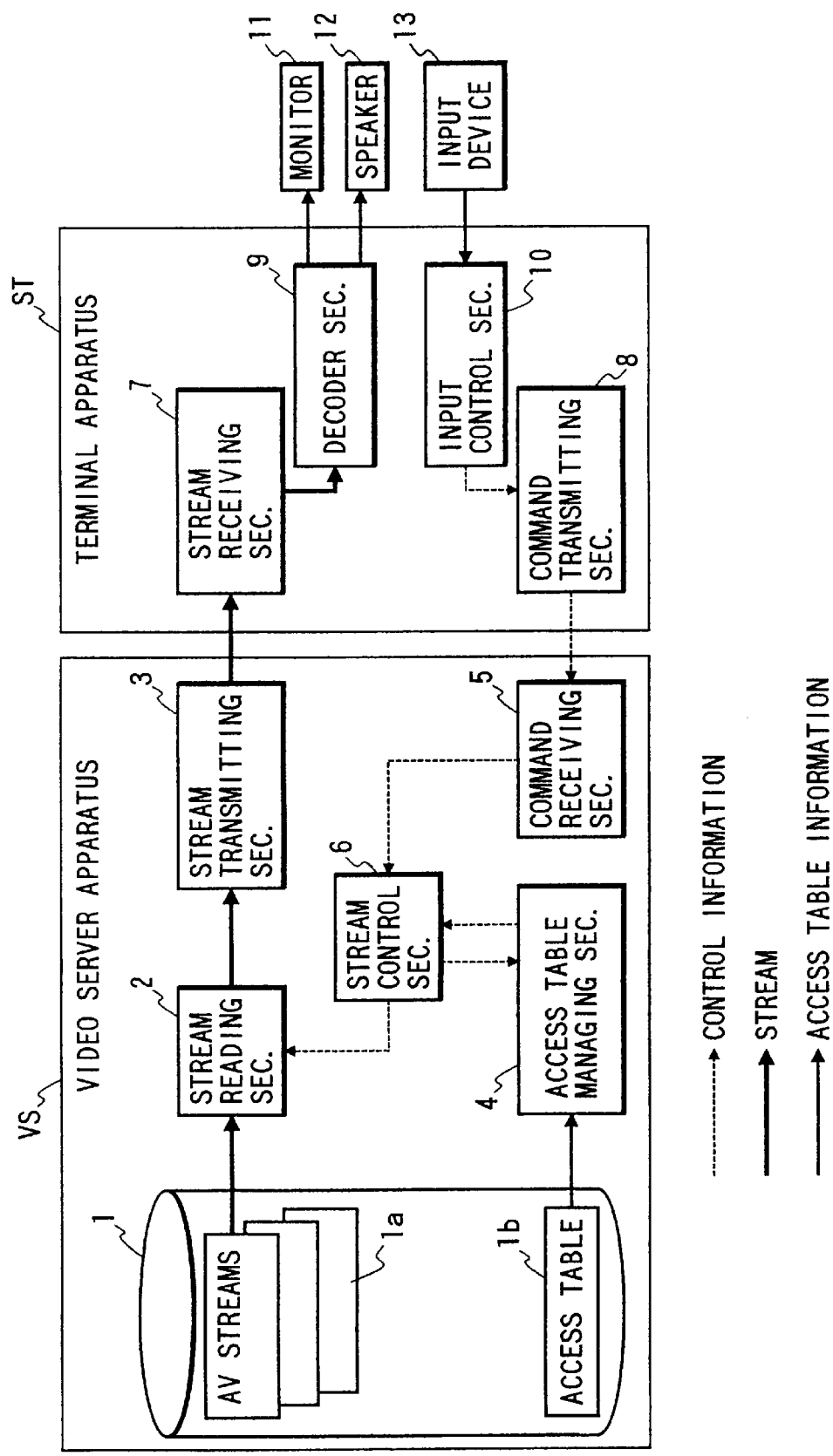
FIG. 1 is a block diagram showing the configuration of a conventional video-on-demand system including a video server apparatus.
Figure 2:
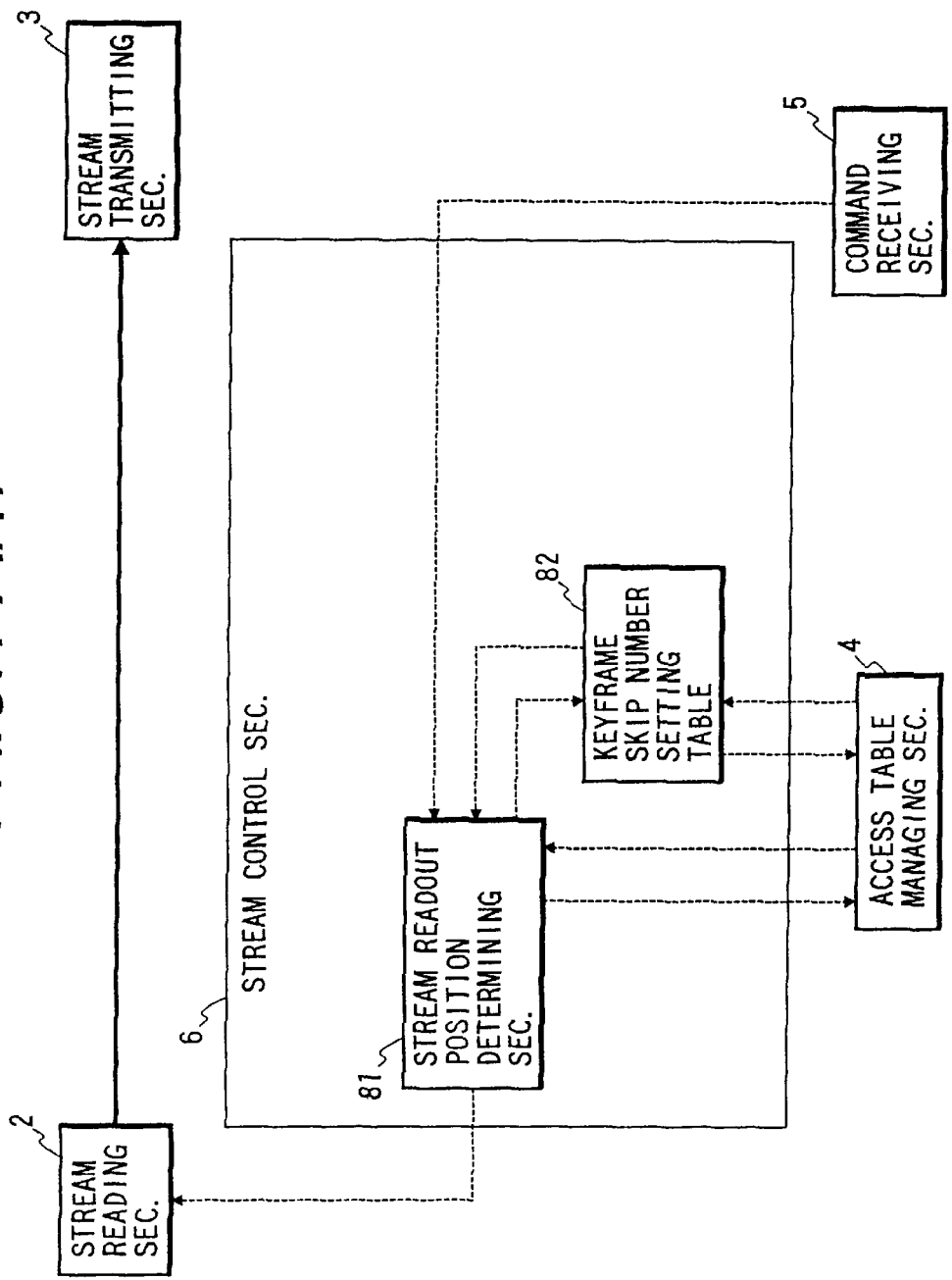
FIG. 2 is a block diagram showing the configuration of a stream control section of the conventional video server apparatus of FIG. 1.
Figure 10:
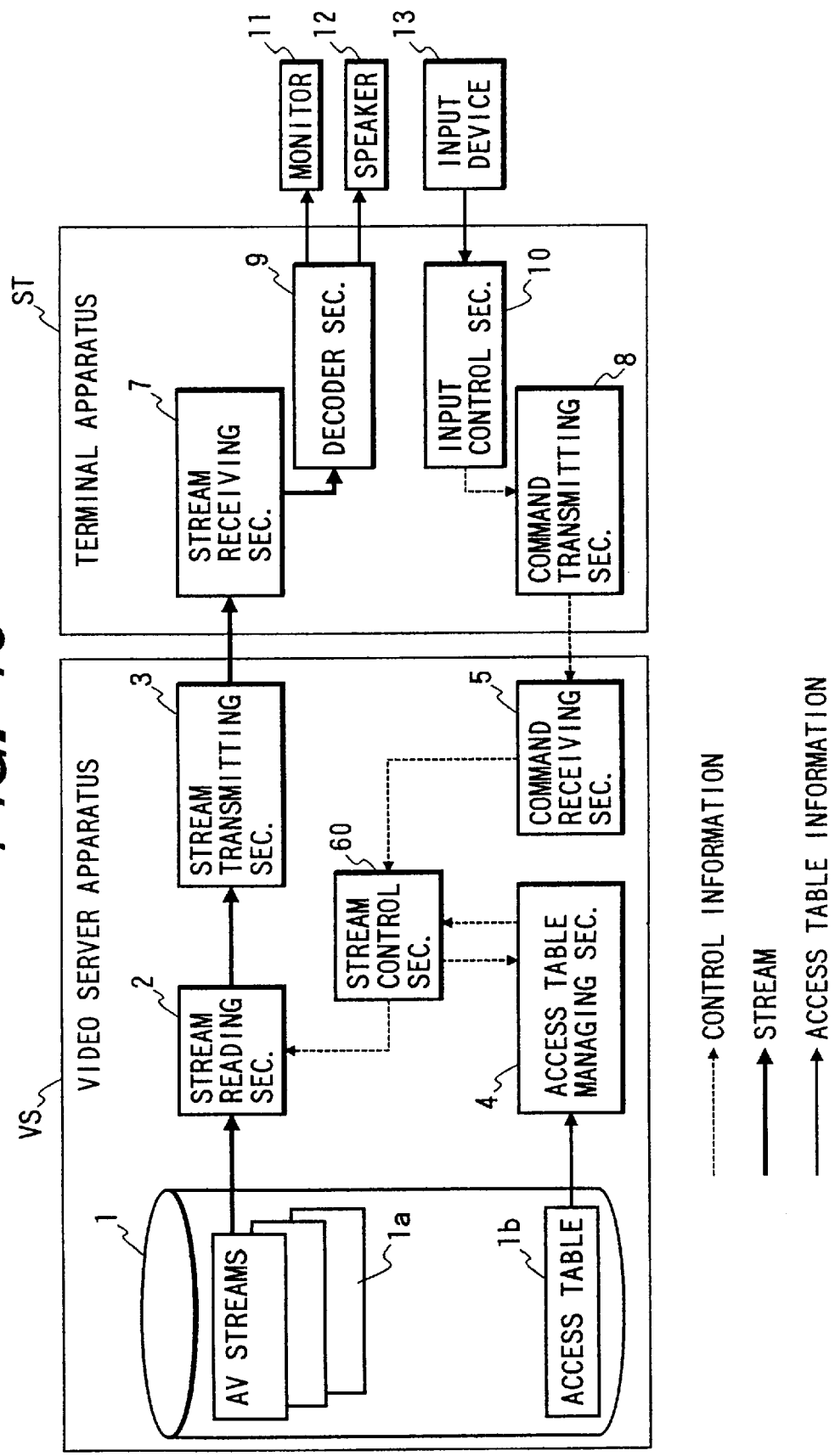
FIG. 10 is a block diagram showing the configuration of a video-on-demand system including a video server apparatus according to a first embodiment of the present invention.

FIG. 10 shows the configuration of a video-on-demand system including a video server apparatus according to a first embodiment of the invention. In FIG. 10, a video server apparatus VS consists of a hard disk 1 as a storage medium, an AV stream 1a, an access table 1b, a stream reading section 2; a stream transmitting section 3; an access table managing section 4; a command receiving section 5, and a stream control section 60. A terminal apparatus ST consists of a stream receiving section 7, a command transmitting section 8, a decoder section 9, and an input control section 10. A monitor 11, a speaker 12, and an input device 13 are connected to the terminal apparatus ST. The video server apparatus of this embodiment different from the conventional video server apparatus of FIG. 1 only in the stream control section 60.

Figure 11:
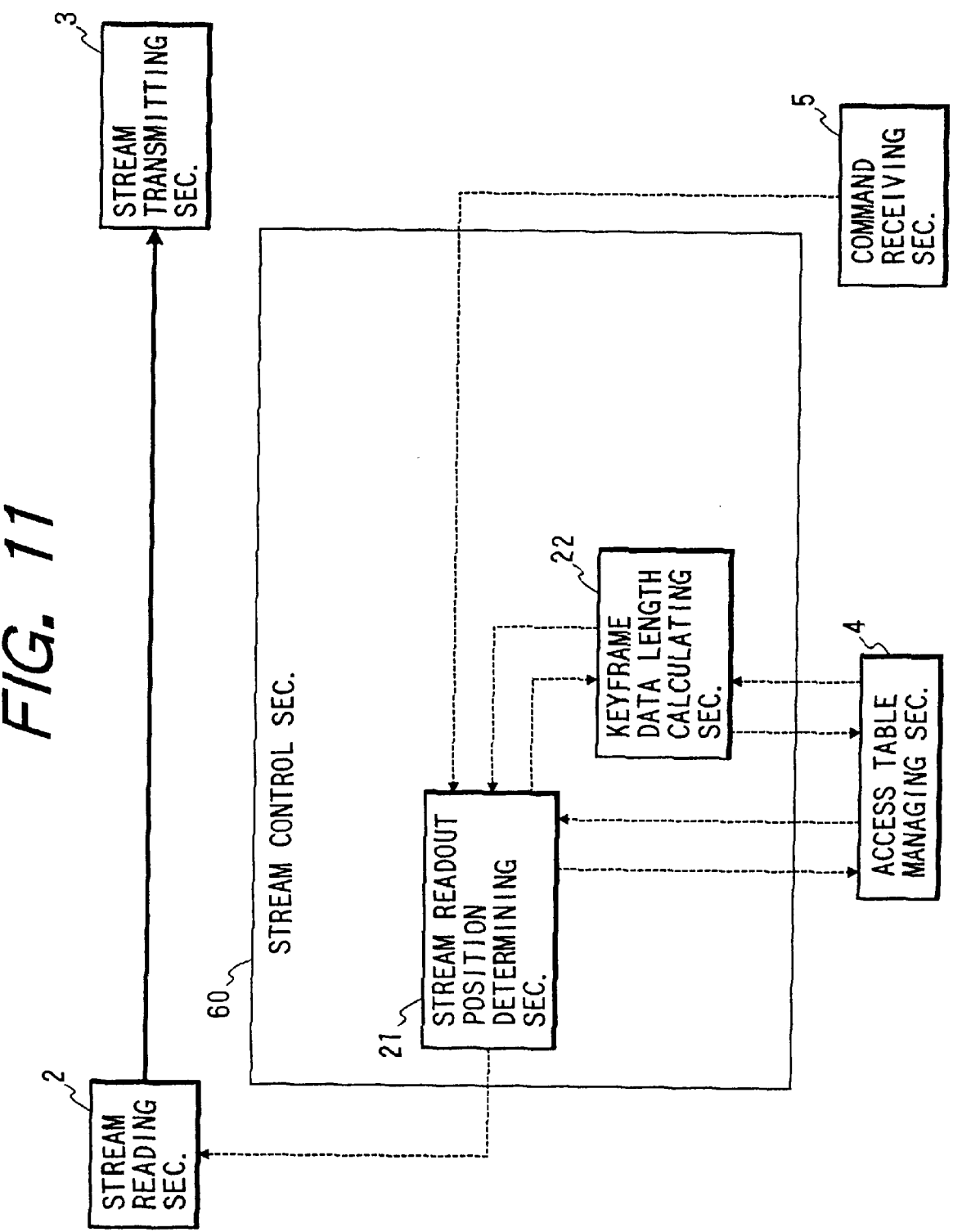
FIG. 11 is a block diagram showing the configuration of a stream control section of the video server apparatus of the first embodiment.

The video server apparatus VS of this embodiment will be described below. FIG. 11 shows the configuration of the stream control section 60 of the video server VS. As shown in FIG. 11, the stream control section 60 has a stream reading position determining section 21 for determining a keyframe that is located in the vicinity of a playback start position designated by the terminal apparatus ST while cooperating with the access table managing section 4, and for informing the stream reading section 2 of a readout position of the determined keyframe. The stream control section 60 also has a keyframe data length calculating section 22 for acquiring data lengths of keyframes of arbitrary intervals from the access table managing section 4.

The operation of the above-configured video server apparatus VS will be described below (the stream control section 60 will be mainly described). When the command receiving section 5 has received a playback start position, the stream readout position determining section 21 determines a readout position of a keyframe that is located in the vicinity of the designated playback start position based on the received playback start position and an address of the keyframe which is acquired by the access table managing section 4 from the access table 1b that is stored in the hard disk 1. When the command receiving section 5 has not received any playback start position, the stream readout position determining section 21 determines a readout position of a keyframe that is designated to be read out next or continuous readout positions of the AV stream 1a. The determined information is sent to the stream reading section 2.

If a playback speed received by the command receiving section 5 means a discontinuous playback such as a high-speed playback, the stream readout position determining section 21 calculates time that is necessary to read out a keyframe having an average data length based on all or an arbitrary number of keyframe data lengths acquired from the access table 1b and a bit rate at which the stream read section 2 reads out the AV stream 1a, and then assumes a keyframe transmission interval. The stream readout position determining section 21 then determines a keyframe to be read out next that satisfies the designated playback speed based on the assumed keyframe transmission interval, the keyframe interval, and the frame frequency. If a playback speed received by the command receiving section 5 means a continuous playback such as a normal playback, a slow playback, or the like, the stream readout position determining section 21 does not determine a keyframe to be read out next.

Specifically, if a playback speed received by the command receiving section 5 means a discontinuous playback such as a high-speed playback, a keyframe average data length KL is calculated as $$KL=(A1+A2+ \ldots +Aa)/a \quad (1)$$

where a is the number of keyframe data acquired from the access table 1b, and Ai (i=1, 2, ..., a) is each keyframe data length.

Further, the time KT necessary to read out a keyframe having the average data length KL and a playback speed PS are calculated as $$KT=KL/BR \quad (2)$$

$$PS=(KI/FR)(NS+1)/KT \quad (3)$$

where BR is a bit rate at which the stream reading section 2 reads out the AV stream 1a, KI is the keyframe interval, FR is the frame frequency, and NS is a keyframe skip number to a keyframe to be read out next.

By using the above equations, the keyframe skip number NS is so determined that the playback speed PS becomes closest to the designated playback speed. If the keyframe interval KI is not constant, an average of keyframe intervals of a stream, for instance, is employed as KI.

The stream reading section 2 reads out the keyframes of the AV stream 1a which are designated by the stream readout position determining section 21 or frames at continuous readout positions, sends those frames to the stream transmitting section 3. The stream transmitting section 3 transmits a stream to the terminal apparatus ST at constant intervals.

According to the first embodiment, by providing the keyframe data length calculating section 22 in the stream control section 60, a keyframe to be read out next is so determined as to keep a playback speed of a high-speed playback based on keyframe data lengths. Therefore, even if the keyframe data length varies stream by stream, a playback speed closest to a designated playback speed is attained and hence a variation in playback speed among streams is minimized, whereby a high-speed playback can be performed more smoothly.

Embodiment 2

Figure 12:
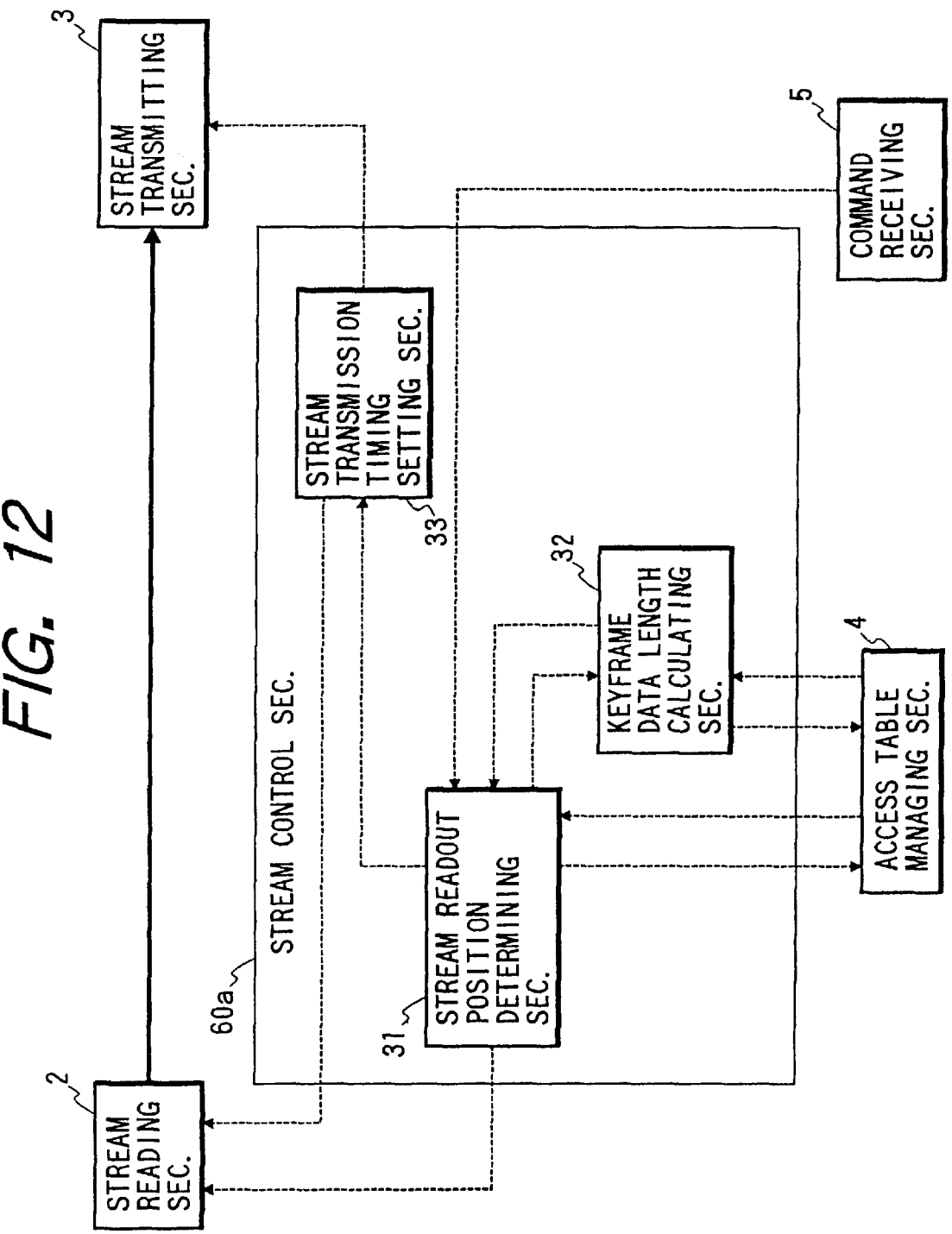
FIG. 12 is a block diagram showing the configuration of a stream control section of a video server apparatus according to the second embodiment of the invention.

A video server apparatus according to a second embodiment of the invention will be described below. FIG. 12 shows the configuration of a stream control section 60a of a video server apparatus VS of this embodiment. The other part of the video server apparatus VS is the same as that of the first embodiment.

As shown in FIG. 12, the stream control section 60a has a stream reading position determining section 31 for determining a keyframe that is located in the vicinity of a playback start position designated by the terminal apparatus ST while cooperating with the access table managing section 4, selecting keyframes that satisfy a playback speed designated by the terminal apparatus ST, and informing the stream reading section 2 of readout positions of those keyframes. The stream control section 60a also has a keyframe data length calculating section 32 for acquiring keyframe data lengths of arbitrary intervals from the access table managing section 4, and a stream transmission timing setting section 33 for informing the stream transmitting section 3 of transmission timing of each key frame.

Figures 4A, 4B:
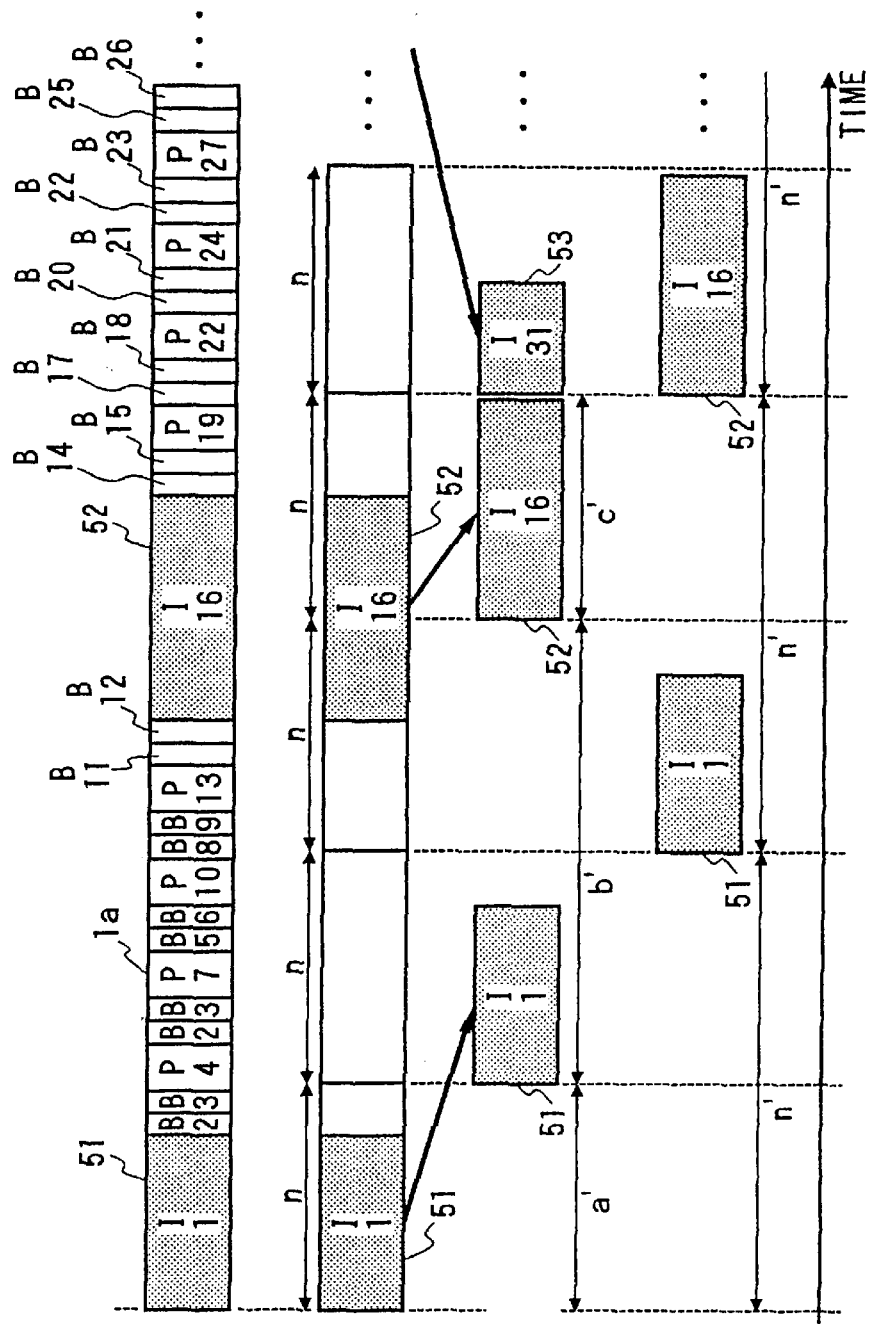
FIG. 4A illustrates keyframe readout intervals in a second-type of high-speed playback in the conventional video server apparatus of FIG. 1.
FIG. 4B illustrate keyframe readout intervals in the second type of high-speed playback in a video server apparatus according to a second embodiment of the invention.

FIG. 3B illustrates keyframe readout intervals of a first type of high-speed playback in this embodiment. In FIG. 3B, character m represents time that is taken to read out a maximum keyframe of a stream at a constant bit rate. FIG. 4B illustrates keyframe readout intervals of a second type of high-speed playback in this embodiment. In FIG. 4B, symbol n' represents time that is taken to read out, at a constant bit rate, most storage unit blocks encompassed by a keyframe of a stream. The other symbols in FIGS. 3B and 4B represent the same items as in FIGS. 3A and 4A, which correspond to the conventional video server apparatus.

The operation of the above-configured video server apparatus VS will be described below (the stream control section 60a will be mainly described). When the command receiving section 5 has received a playback start position, the stream readout position determining section 31 determines a readout position of a keyframe that is located in the vicinity of the designated playback start position based on the received playback start position and an address of the keyframe which is acquired by the access table managing section 4 from the access table 1b that is stored in the hard disk 1. When the command receiving section 5 has not received any playback start position, the stream readout position determining section 31 determines a readout position of a keyframe that is designated to be read out next or continuous readout positions of the AV stream 1a. The determined information is sent to the stream reading section 2.

If a playback speed received by the command receiving section 5 means a discontinuous playback such as a high-speed playback, the stream readout position determining section 31 calculates a readout time m of the maximum keyframe based on all or an arbitrary number of keyframe data lengths acquired from the access table 1b and the maximum bit rate at which the stream read section 2 reads out the AV stream 1a, employs the calculated readout time m as a keyframe transmission interval, and informs the stream transmission timing setting section 33 of the calculated keyframe transmission interval. The stream readout position determining section 31 then determines a keyframe to be read out next that satisfies the designated playback speed based on the calculated keyframe transmission interval, the keyframe interval, and the frame frequency. If a playback speed received by the command receiving section 5 means a continuous playback such as a normal playback, a slow playback, or the like, the stream readout position determining section 31 does not determine a keyframe to be read out next.

Specifically, if a playback speed received by the command receiving section 5 means a discontinuous playback such as a high-speed playback, the readout time m of the maximum keyframe is calculated as $$m = Am/BR \qquad (4)$$

where Am is the maximum keyframe data length acquired from the access table 1b and BR is a bit rate at which the stream reading section 2 reads out the AV stream 1a.

Further, a playback speed PS is calculated as $$PS = (KI/FR)(NS+1)/m \qquad (5)$$

where KI is the keyframe interval, FR is the frame frequency, and NS is a keyframe skip number to a keyframe to be read out next.

By using the above equations, the keyframe skip number NS is so determined that the playback speed PS becomes closest to the designated playback speed. If the keyframe interval KI is not constant, an average of keyframe intervals of a stream, for instance, is employed as KI.

In the case of a high-speed playback, the stream transmission timing setting section 33 instructs the stream transmitting section 3 to transmit a keyframe as read out by the stream reading section 2 at the keyframe transmission interval that is designated by the stream readout position determining section 31, and informs the stream reading section 2 of read timing of the next keyframe.

Next, a description will be made of a case where the stream reading section 2 reads out an AV stream 1a on an arbitrary, fixed-length block basis. If a playback speed received by the command receiving section 5 means a discontinuous playback such as a high-speed playback, the stream readout position determining section 31 calculates a readout time n' of a maximum number of fixed-length blocks of the AV stream 1a encompassed by a keyframe based on the received playback speed, all or an arbitrary number of keyframe addresses and data lengths acquired from the access table 1b by the keyframe data length calculating section 31, and the maximum bit rate at which the stream read section 2 reads out the AV stream 1a, employs the calculated readout time n' as a keyframe transmission interval. The stream readout position determining section 31 then determines a keyframe to be read out next based on the calculated keyframe transmission interval, the keyframe interval, and the frame frequency.

Specifically, a playback speed PS is calculated as $$PS = (KI/FR)(NS+1)/n' \qquad (6)$$

where n' is the continuous readout time of all the fixed-length blocks encompassed by a keyframe, KI is the keyframe interval, FR is the frame frequency, and NS is a keyframe skip number to a keyframe to be read out next.

By using the above equations, the keyframe skip number NS is so determined that the playback speed PS becomes closest to the designated playback speed. If the keyframe interval KI is not constant, an average of keyframe intervals of a stream, for instance, is employed as KI.

According to the second embodiment, by providing the stream transmission timing setting section 33 in the stream control section 60a, the keyframe transmission interval is set longer than the maximum keyframe readout time during a high-speed playback. Therefore, even if the keyframe data length varies in one stream, the transmission frame interval is kept constant for an arbitrarily designated playback speed, thereby providing a high-speed playback that can be viewed more comfortably.

Embodiment 3

Figure 13:
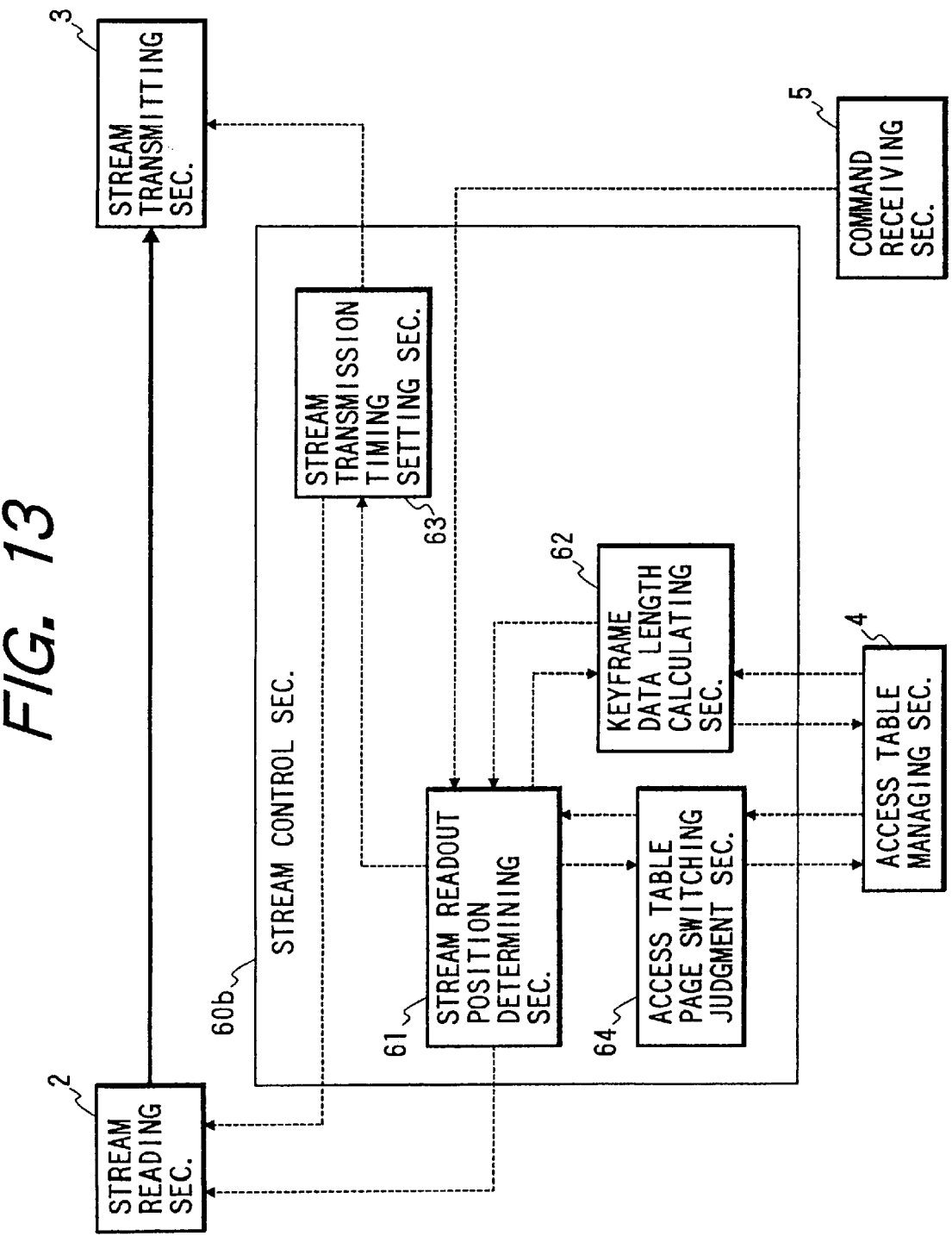
FIG. 13 is a block diagram showing the configuration of a stream control section of a video server apparatus according to the third embodiment of the invention.

A video server apparatus according to a third embodiment of the invention will be described below. FIG. 13 shows the configuration of a stream control section 60b of a video server apparatus VS of this embodiment. The other part of the video server apparatus VS is the same as that of the first embodiment.

As shown in FIG. 13, the stream control section 60b has a stream reading position determining section 61 for determining a keyframe that is located in the vicinity of a playback start position designated by the terminal apparatus ST while cooperating with the access table managing section 4, and for informing the stream reading section 2 of a readout position of the determined keyframe. The stream control section 60b also has a keyframe data length calculating section 62 for acquiring keyframe data lengths of at arbitrary intervals from the access table managing section 4, a stream transmission timing setting section 63 for informing the stream transmitting section 3 of transmission timing of each keyframe, and an access table page switching judgment section 64 for instructing the access table managing section 4 to acquire, from the hard disk 1, keyframe addresses that are to be managed by the access table managing section 4.

Figures 5A, 5B:
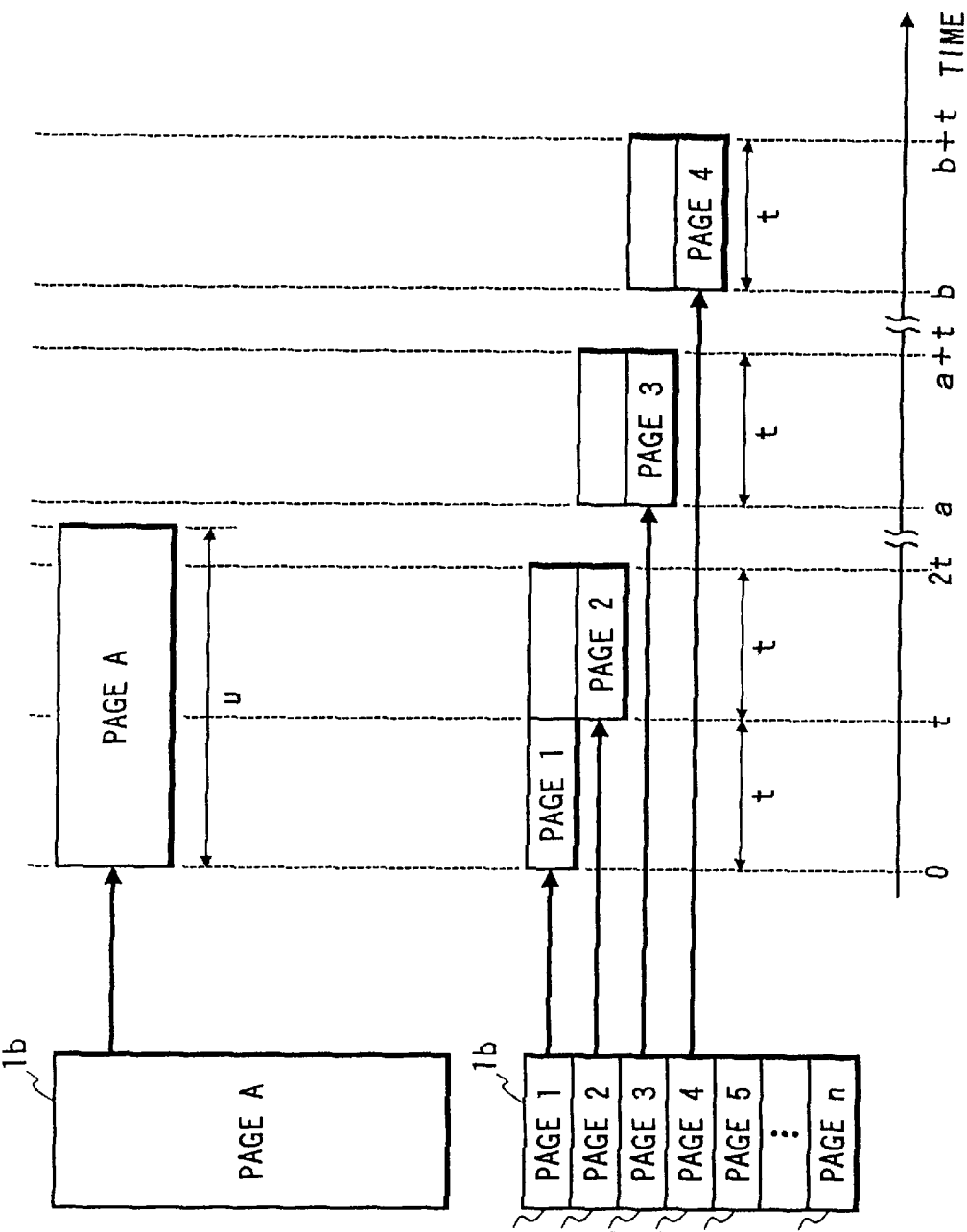
FIG. 5A illustrates the operation of an access table managing section of the conventional video server apparatus of FIG. 1.
FIG. 5B illustrates the operation of an access table managing section of a video server apparatus according to a third embodiment of the invention.
Figure 6A:
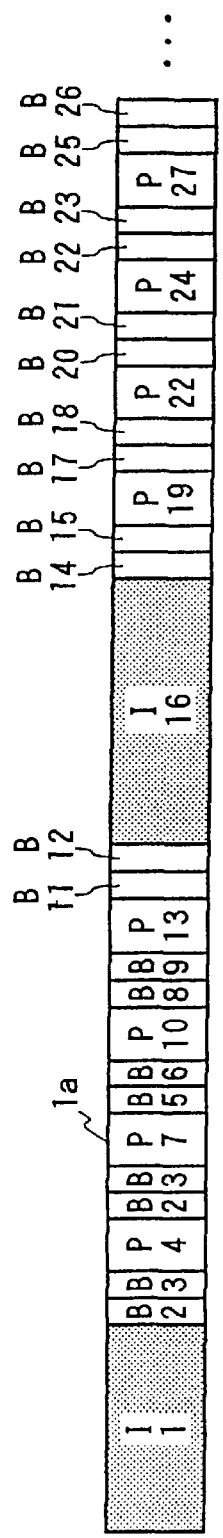
FIG. 6A illustrates a frame storage order of an AV stream.
Figure 6B:
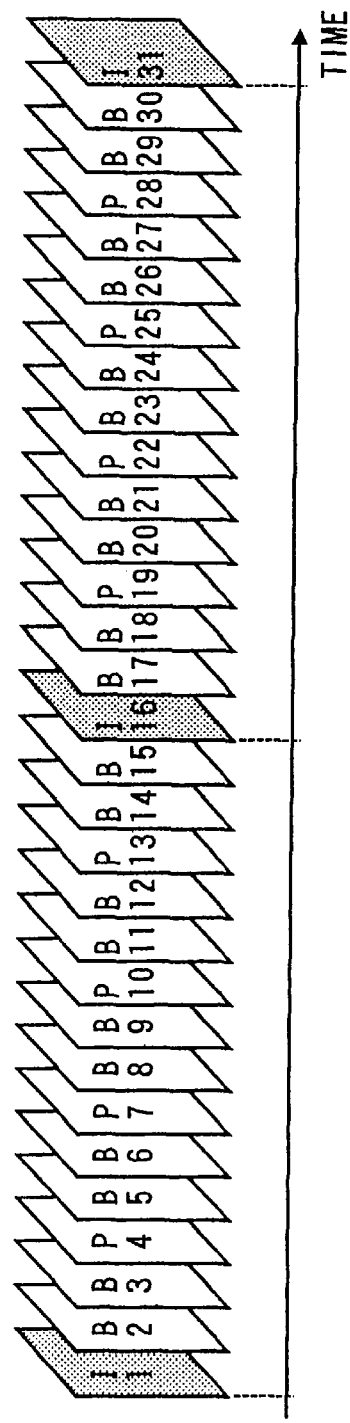
FIG. 6B illustrates a frame playback order of an AV stream in a normal playback.
Figure 7:
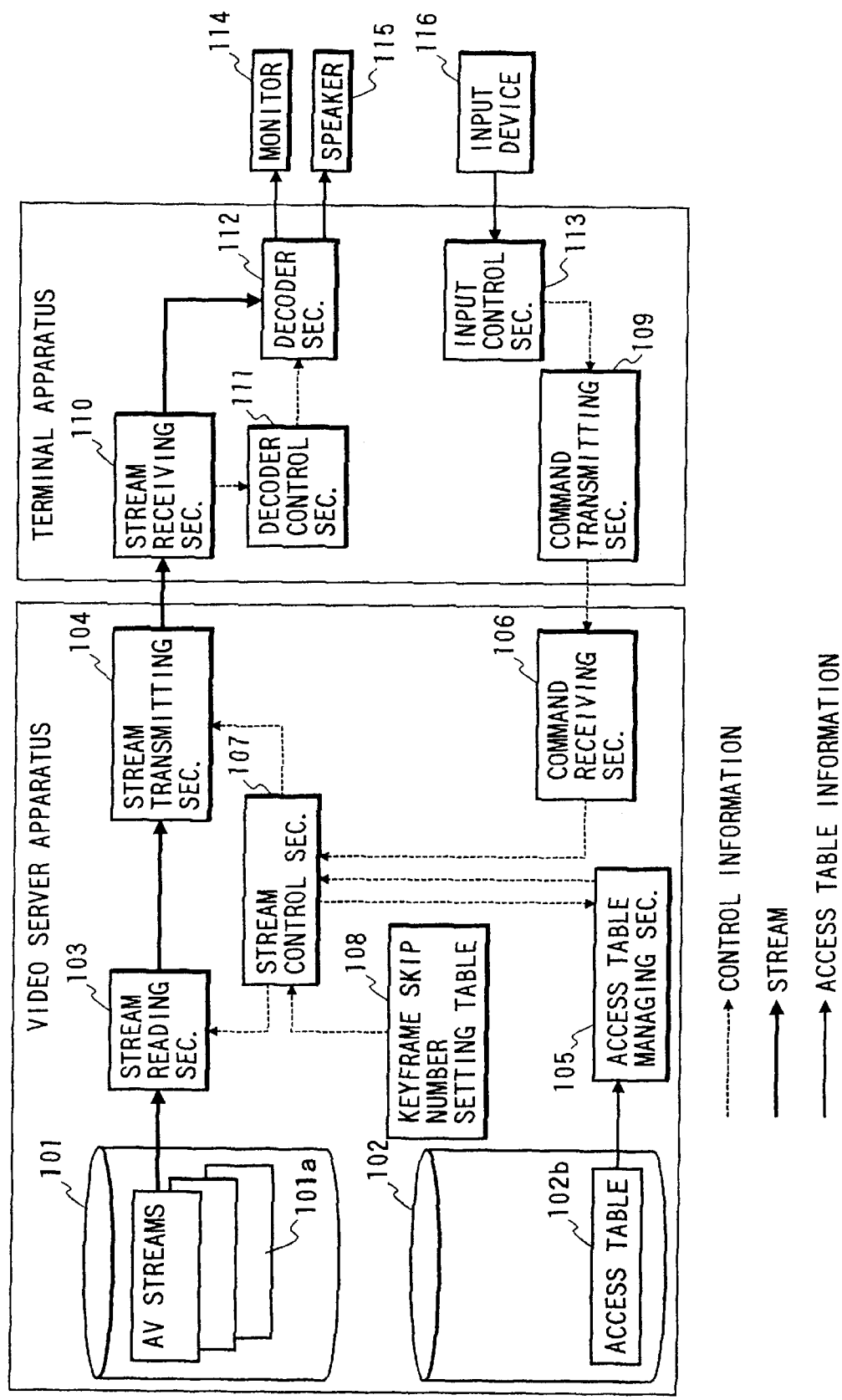
FIG. 7 is a block diagram showing the configuration of another conventional video-on-demand system.
Figure 8:
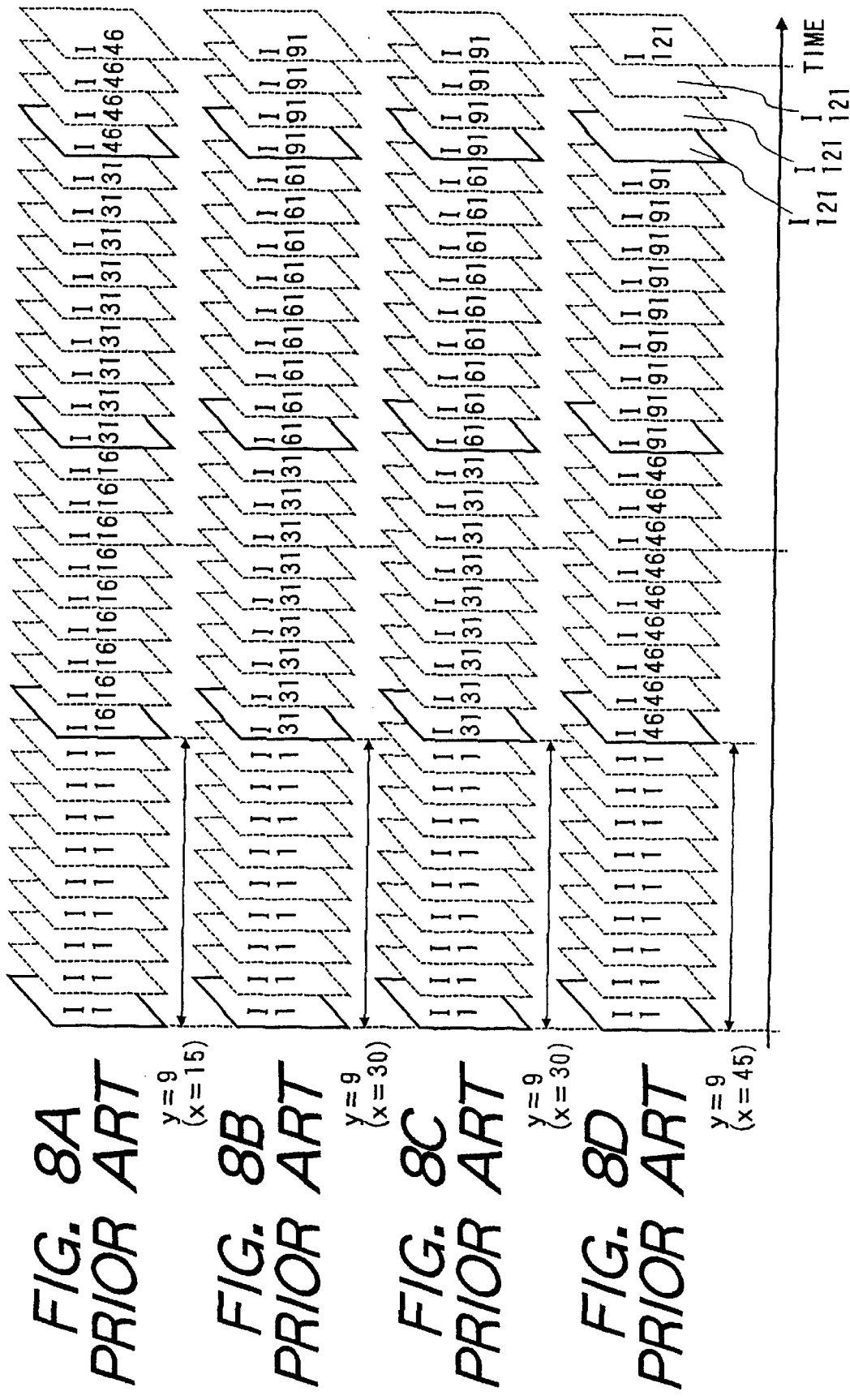
FIGS. 8A–8D illustrate playback fame sequences in the conventional system of FIG. 7.

FIG. 5B illustrates the operation of the access table managing section 4 in this embodiment. In FIG. 5B, reference numerals 71–75 denote first to fifth pages of the access table 1b, numeral 76 denotes an nth page of the access table 1b, and character t denotes time that is taken to read out one page of the access table 1b at a constant bit rate.

The operation of the above-configured video server apparatus VS will be described below (the stream control section 60b will be mainly described). When the command receiving section 5 has received a playback start position, the stream readout position determining section 61 determines a readout position of a keyframe that is located in the vicinity of the designated playback start position based on the received playback start position and an address of the keyframe which is acquired by the access table managing section 4 from the access table 1b that is stored in the hard disk 1. When the command receiving section 5 has not received any playback start position, the stream readout position determining section 31 determines a readout position of a keyframe that is designated to be read out next or continuous readout positions of the AV stream 1a. The determined information is sent to the stream reading section 2.

If a playback speed received by the command receiving section 5 means a discontinuous playback such as a high-speed playback, the stream readout position determining section 61 calculates a keyframe transmission interval based on all or an arbitrary number of keyframe data lengths acquired from the access table 1b by the keyframe data length calculating section 62 and the maximum bit rate at which the stream read section 2 reads out the AV stream 1a, and informs the stream transmission timing setting section 63 of the calculated keyframe transmission interval. The stream readout position determining section 61 then determines a keyframe to be read out next that satisfies the designated playback speed based on the calculated keyframe transmission interval, the keyframe interval, and the frame frequency. If a playback speed received by the command receiving section 5 means a continuous playback such as a normal playback, a slow playback, or the like, the stream readout position determining section 31 does not determine a keyframe to be read out next.

In the case of a high-speed playback, the stream transmission timing setting section 63 instructs the stream transmitting section 3 to transmit a keyframe as read out by the stream reading section 2 at the keyframe transmission interval that is designated by the stream readout position determining section 31, and informs the stream reading section 2 of read timing of the next keyframe. The access table managing section 4 reads out the access table 1b from the hard disk 1 on a page-by-page basis (one page corresponds to an arbitrary time or an arbitrary data length). The access table page switching judgment section 64 compares a playback start position associated with the current processing of the stream readout position determining section 61 with a positional range of pages that have been acquired by the access table managing section 4, and judges whether to acquire the next page of the access table 1b. A judgment result is sent to the access table managing section 4.

For example, when the stream readout position determining section 61 has received a playback request, the access table page switching judgment section 64 instructs the access table managing section 4 to read out the first page 71 of the access table 1b. In response, the access table managing section 4 reads out the first page 71 of the access table 1b. This reading takes time t. When the first page 71 has been acquired, the stream readout position determining section 61 starts its playback processing. When the stream readout position determining section 61 processes the head keyframe of the first page of the access table 1b, the access table page switching judgment section 64 instructs the access table managing section 4 to acquire the second page 72 of the access table 1b. The access table managing section 4 operates in the same manner as in the above embodiments.

Thereafter, when the stream readout position determining section 61 processes the head keyframe the second one of the pages being held by the access table managing section 4, the access table managing section 4 acquires a new page of the access table 1b. Thus, the access table managing section 4 always retains 0, 1 or 2 access table pages.

According to the third embodiment, by providing the access table page switching judgment section 61 in the stream control section 60b, a playback can be started upon acquisition of part of the access table 1b. Therefore, a response time from a playback request to a playback start can be shortened.

In the invention, the manner of arranging contents of the access table 1b in the access table managing section 4 and the manner of referencing the access table 1b from the access table managing section 4, the data size n of fixed-length blocks, the unit of dividing the access table 1b, and the frame configuration of the AV stream 1a are not limited to those in the first to third embodiments. Although in the above embodiments the storage medium is a hard disk, there may be used an optical disk, a magnetic tape, a semiconductor memory, arrayed disks such as a RAID, and an arrayed structures of other types of storage media. Although in the above embodiments the storage subject is an AV stream, it may be a video stream or an audio stream. Although the above embodiments employ MPEG as the coding scheme of the AV stream 1a, JPEG and other types of coding schemes may be employed. It is apparent that a more smooth high-speed playback can be attained by making the bit rate at which the stream transmitting section 3 transmits all or part of an AV stream 1a or the bit rate at which the stream reading section 2 reads out all or part of the AV stream 1a higher than that in a normal playback. Further, the AV streams 1a may be stored in a physically distributed manner.

Embodiment 4

Figure 14:
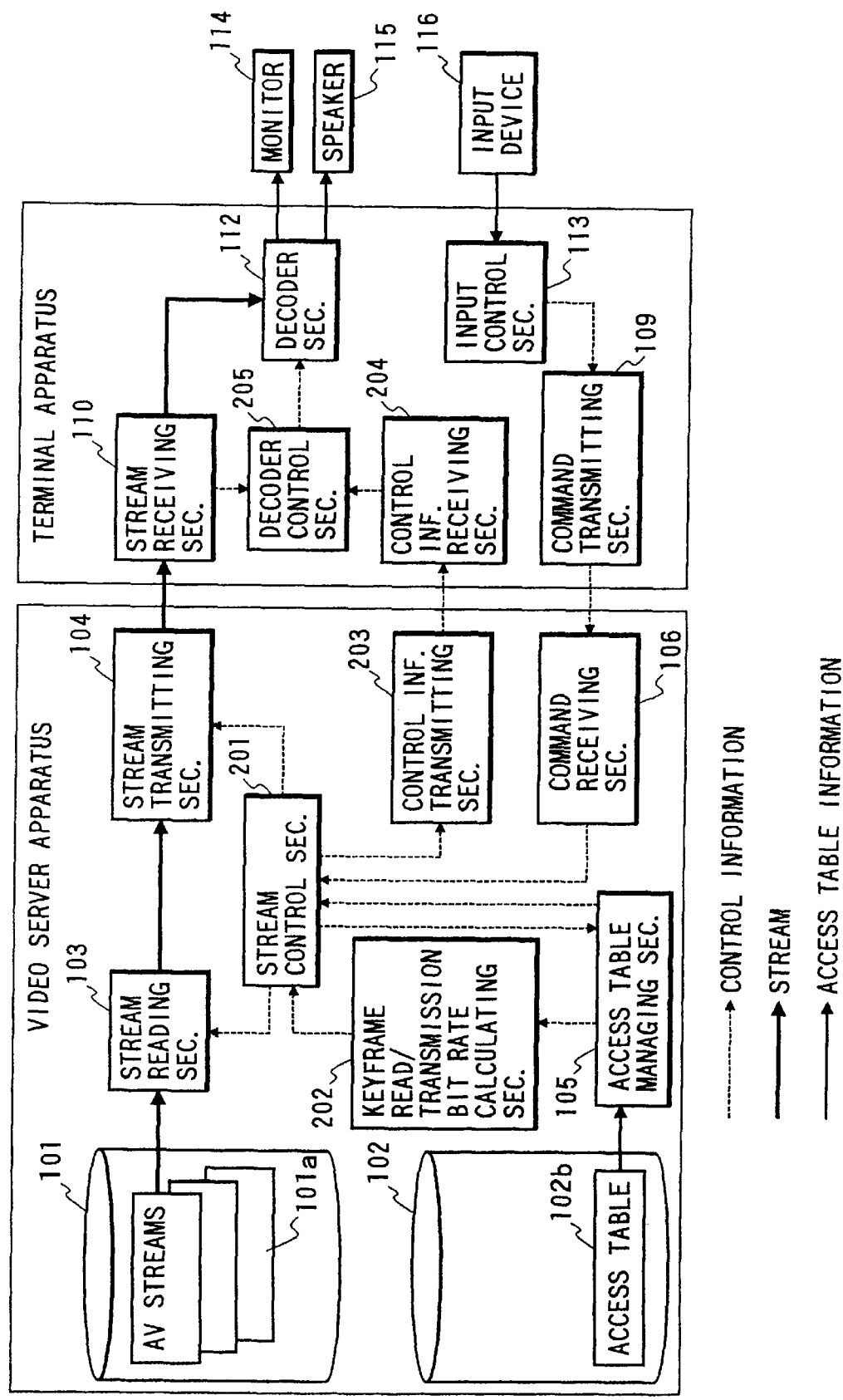
FIG. 14 is a block diagram showing a video-on-demand system according to a fourth embodiment of the invention.

FIG. 14 shows a video-on-demand system according to a fourth embodiment of the invention. As shown in FIG. 14, a video server apparatus of this system consists of a hard disk 101 for storing AV (audio-video) streams 101a, a hard disk 102 for storing an access table 102b to be used in accessing the AV streams 101a, a stream reading section 103 for reading out an AV stream 101a from the hard disk 101, a stream transmitting section 104 for transmitting the read-out AV stream to a terminal apparatus, an access table managing section 105 for managing the access table 102b, a command receiving section 106 for receiving a command from the terminal apparatus, a stream control section 201 for controlling reading and transmission of the AV stream in accordance with instructions from the terminal apparatus, a keyframe read/transmission bit rate calculating section 202 for calculating a keyframe read bit rate, a keyframe transmission bit rate, and a keyframe data length when only keyframes of the AV stream are read out, and a control information transmitting section 203 for transmitting a keyframe playback to the terminal apparatus interval of a high-speed playback.

The terminal apparatus consists of an input control section 113 for generating a command in response to an input manipulation on an input device 116, a command transmitting section 109 for transmitting the generated command to the video server apparatus, a stream receiving section 110 for receiving an AV stream from the video server apparatus, a decoder section 112 for decoding the received AV stream, a control information receiving section 204 for receiving information of a keyframe playback interval from the video server apparatus, and a decoder control section 205 for controlling the decoder section 112 so that decoding is performed at the keyframe playback interval that is obtained from the control information receiving section 204 when the playback mode that is obtained from the stream receiving section 110 is changed to a high-speed playback mode. The input device 116 such as a keyboard or a mouse, a monitor 114 for displaying decoded images and a speaker 115 for outputting decoded sound are connected to the terminal apparatus.

The operation of the above-configured system will be described below.

A signal that is input from the input device 116 is converted, by the input control section 113 of the terminal apparatus, into a program designation command and commands indicating a playback start position and a playback speed, which commands are transmitted from the command transmitting section 109 to the command receiving section 106 of the video server apparatus.

The stream control section 201 of the video server apparatus determines an AV stream to be read out, keyframes to be read out, and their storage locations based on the program information, the playback start position, and the playback speed that are received by the command receiving section 106, and keyframe information that is managed by the access table managing section 105. The stream control section 201 informs the stream reading section 103 of the determined information, and instructs the stream reading section 103 to read out the stream from the hard disk 101.

If the playback speed means a high-speed playback, the keyframe read/transmission bit rate calculating section 102 calculates a keyframe average data length based on data lengths of the respective keyframes (i.e., I frames) of the AV stream that are recorded in the access table 102b, calculates a read bit rate based on the keyframe average data length, and a coding bit rate and a recording format (i.e., byte basis, fixed-length-block basis, or the like) of the AV stream that are recorded in the access table 102b, and determines a transmission bit rate based on the number of terminal apparatuses currently communicating with the video server apparatus and other information.

In the case of a high-speed playback, the stream control section 201 determines a keyframe playback interval and a keyframe readout interval based on the keyframe read bit rate, the key frame transmission bit rate, and the keyframe average data length that are obtained from the keyframe read/transmission bit rate calculating section 202, a keyframe interval that is obtained from the access table managing section 105, and the playback speed designated by the terminal apparatus. The stream control section 201 informs the control information transmitting section 203 of the keyframe playback interval. Further, the stream control section 201 informs the stream reading section 103 of the keyframe readout interval and the keyframe readout positions, and instructs the stream reading section 103 to read out the designated keyframes and to add a playback mode indicating a change in playback speed to the read-out stream.

How the stream control section 201 determines the keyframe playback interval and the keyframe readout interval will be described later.

The control information transmitting section 203 transmits the keyframe playback interval that has been determined by the stream control section 201 to the terminal apparatus. On the other hand, the stream reading section 103 reads out the designated keyframes of the AV stream 101a at the designated read bit rate, and inserts or buries a playback mode into a stream that consists only of the read-out keyframes. The stream transmitting section 104 transmits the stream that is received from the stream reading section 103 to the stream receiving section 110 of the terminal apparatus. The stream control section 201 controls the transmitting operation of the stream transmitting section 104 based on the information of the transmission bit rate that is obtained from the keyframe read/transmission bit rate calculating section 202.

In the terminal apparatus, the decoder control section 205 controls the decoder section 112 so that decoding is performed in accordance with the keyframe playback interval received by the control information receiving section 204 by using, as a trigger, the playback mode extracted from the stream by the stream receiving section 110. The stream received by the stream receiving section 110 is decoded by the decoder section 112 and then output from the monitor 114 as images. It is sufficient that the keyframe playback interval be received at least once per change in playback speed. In the case of a high-speed playback, the decoder control section 205 controls the decoder section 112 so that it does not decode audio data.

The operation of a normal playback is the same as in the conventional system.

As described above, in the system according to the fourth embodiment, the video server apparatus is provided with the stream control section 201 for determining a keyframe readout interval and a keyframe playback interval that satisfy a playback speed that is designated by the terminal apparatus, as well as the control information transmitting section 203 for transmitting the keyframe playback interval to the terminal apparatus. The terminal apparatus is provided with the control information receiving section 204 for receiving the keyframe playback interval. This enables the video server apparatus to designate a keyframe playback interval that is to be used in the terminal apparatus, whereby a high-speed playback can be performed at an arbitrary playback speed that is requested by the terminal apparatus.

Next, a description will be made of how the keyframe playback interval and the keyframe readout interval are determined by the stream control section 201. There are three methods, which will be described in fifth to seventh embodiments respectively.

Embodiment 5

In the first method for determining a keyframe playback interval and a keyframe readout interval that realize a designated playback speed multiplication factor, the stream control section 201 of the video server apparatus divides a keyframe average data length that is calculated by the keyframe read/transmission bit rate calculating section 202 by a smaller one of a keyframe read bit rate and a keyframe transmission bit rate, to thereby determine a minimum keyframe playback interval, that is, a minimum interval that allows complete transmission of keyframes (keyframe data cannot be transmitted completely in a period shorter than this interval).

Then, a shortest one of intervals consisting of the keyframe interval of a stream and its integral multiples which intervals are longer than the minimum keyframe playback interval is selected, and is made a keyframe playback interval. If a playback speed is designated by the terminal apparatus, a keyframe readout interval is calculated as a product of the keyframe playback interval and the playback speed multiplication factor.

An example of the method for determining a keyframe playback interval and a keyframe readout interval will be described with reference to a playback speed table of FIG. 15, whose contents are the same as those of the table of FIG. 9. It is assumed that the minimum keyframe playback interval is 9. With the keyframe interval of 15, a smallest one among multiples of 15 which is larger than 9 is 15. Therefore, a keyframe playback interval y is set at 15. Then, if a double-speed playback is designated by the terminal apparatus, a keyframe readout interval x is calculated as 15×2=30. Thus, the stream reading section 103 reads out one keyframe per 30 frames; that is, frame numbers 1, 31, 61, . . . are read out.

Read-out keyframes are transmitted to the terminal apparatus. A double-speed playback is effected such that under the control of the decoder control section 205, each keyframe is decoded 15-frames after display of the preceding keyframe as shown in FIG. 16A.

Figure 16:
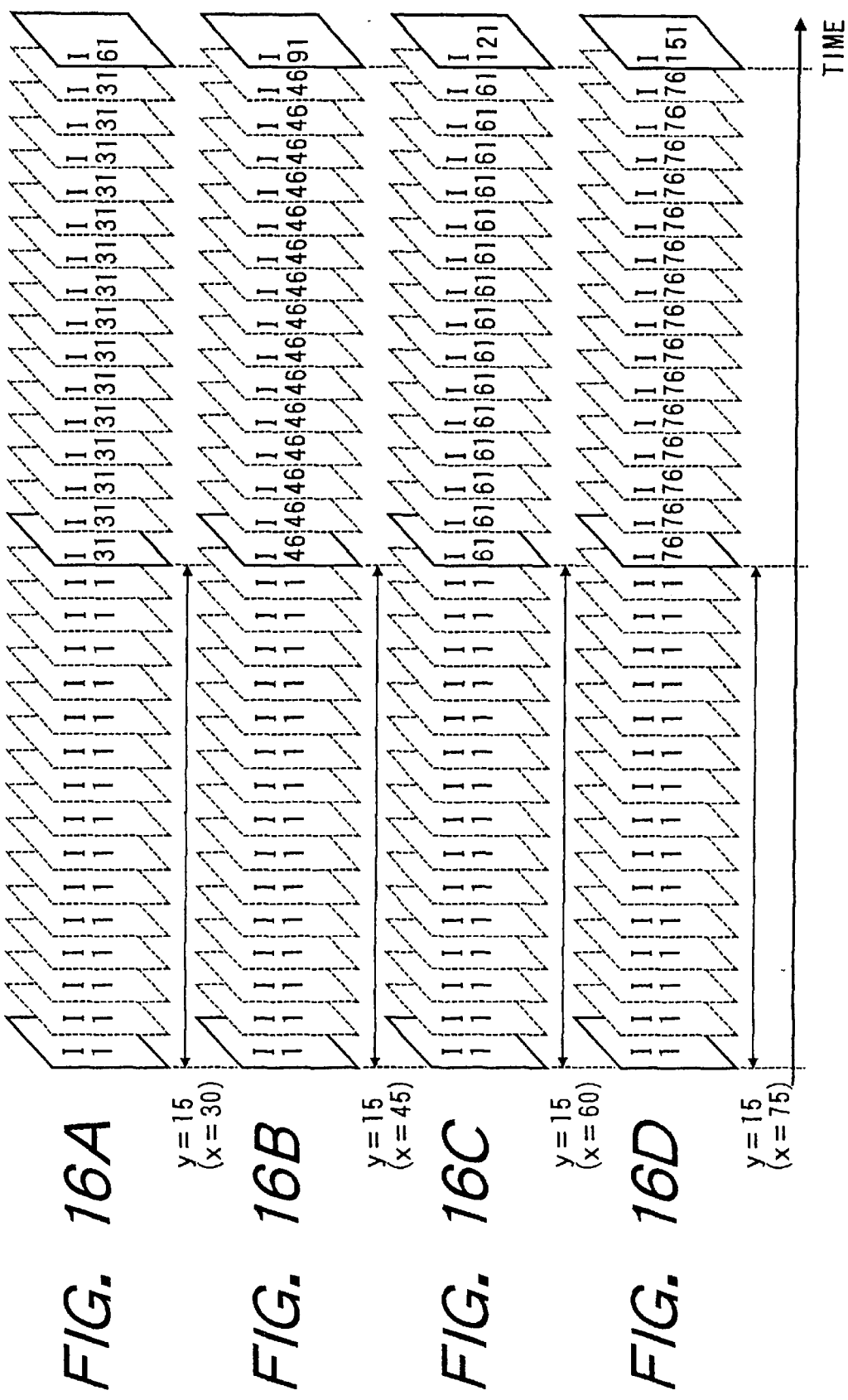
FIGS. 16A–16D illustrate playback frame sequences in the video-on-demand-system of the fifth embodiment.

FIGS. 16B–16D show cases of triple-speed, quadruple-speed, and 5-fold-speed playbacks, respectively.

This method can determine, by a simple procedure, a keyframe playback interval and a keyframe readout interval for realizing a playback speed designated by the terminal apparatus. Further, once keyframe playback intervals are set for a certain stream, they will be effective for subsequent high-speed playbacks of respective multiplication factors. Therefore, information of the keyframe playback interval can easily be transmitted to the terminal apparatus, and the keyframe playback interval can easily be controlled in the terminal apparatus.

Embodiment 6

In the second method for determining a keyframe playback interval and a keyframe readout interval that realize a designated playback speed multiplication factor, the stream control section 201 of the video server apparatus determines a minimum keyframe playback interval in the same manner as in the fifth embodiment. Then, the stream control section 201 selects a shortest one of intervals consisting of the keyframe interval of a stream and its integral multiples which intervals are longer than the minimum keyframe playback interval, and makes it a basic keyframe playback interval. If a playback speed is designated by the terminal apparatus, a basic keyframe readout interval is calculated as a product of the basic keyframe playback interval and the playback speed multiplication factor.

Next, a search is made for such a combination of a keyframe playback interval y and a keyframe readout interval x that x/y coincides with the designated multiplication factor, where the keyframe playback interval y is longer than the minimum keyframe playback interval and shorter than the basic keyframe playback interval.

If an intended keyframe playback interval y and keyframe readout interval x are found by this search, they are employed as a keyframe playback interval and a keyframe readout interval. If not found, the basic keyframe playback interval and the basic keyframe readout interval are employed as a keyframe playback interval and a keyframe readout interval.

An example of the method for determining a keyframe playback interval and a keyframe readout interval will be described with reference to a playback speed table of FIG. 17, whose contents are the same as those of the table of FIG. 9. It is assumed that the minimum keyframe playback interval is 9. With the keyframe interval of 15, a smallest one among multiples of 15 which is larger than 9 is 15. Therefore, a basic keyframe playback interval is set at 15. Then, if a double-speed playback is designated by the terminal apparatus, a basic keyframe readout interval is calculated as 15×2=30.

Then, a search is made for such a combination of a keyframe playback interval y and a keyframe readout interval x that x/y is equal to 2, where y is in a range of 9 to 15 (region 141 in FIG. 17). Since no such combination is found in this case, the basic keyframe playback interval of 15 is set as a keyframe playback interval and the basic readout interval of 30 is set as a keyframe readout interval.

If a triple-speed playback is designated by the terminal apparatus, a basic keyframe readout interval is calculated as 15×3=45. Then, a search is made for such a combination of a keyframe playback interval y and a keyframe readout interval x that x/y is equal to 3, where y is in a range of 9 to 15. In this case, since a combination y=10 and x=30 is found, 10 is set as a keyframe playback interval and 30 is set as a keyframe readout interval.

As is understood from the above examples, in the method of this embodiment, the keyframe playback interval may vary with the playback speed.

Figure 18:
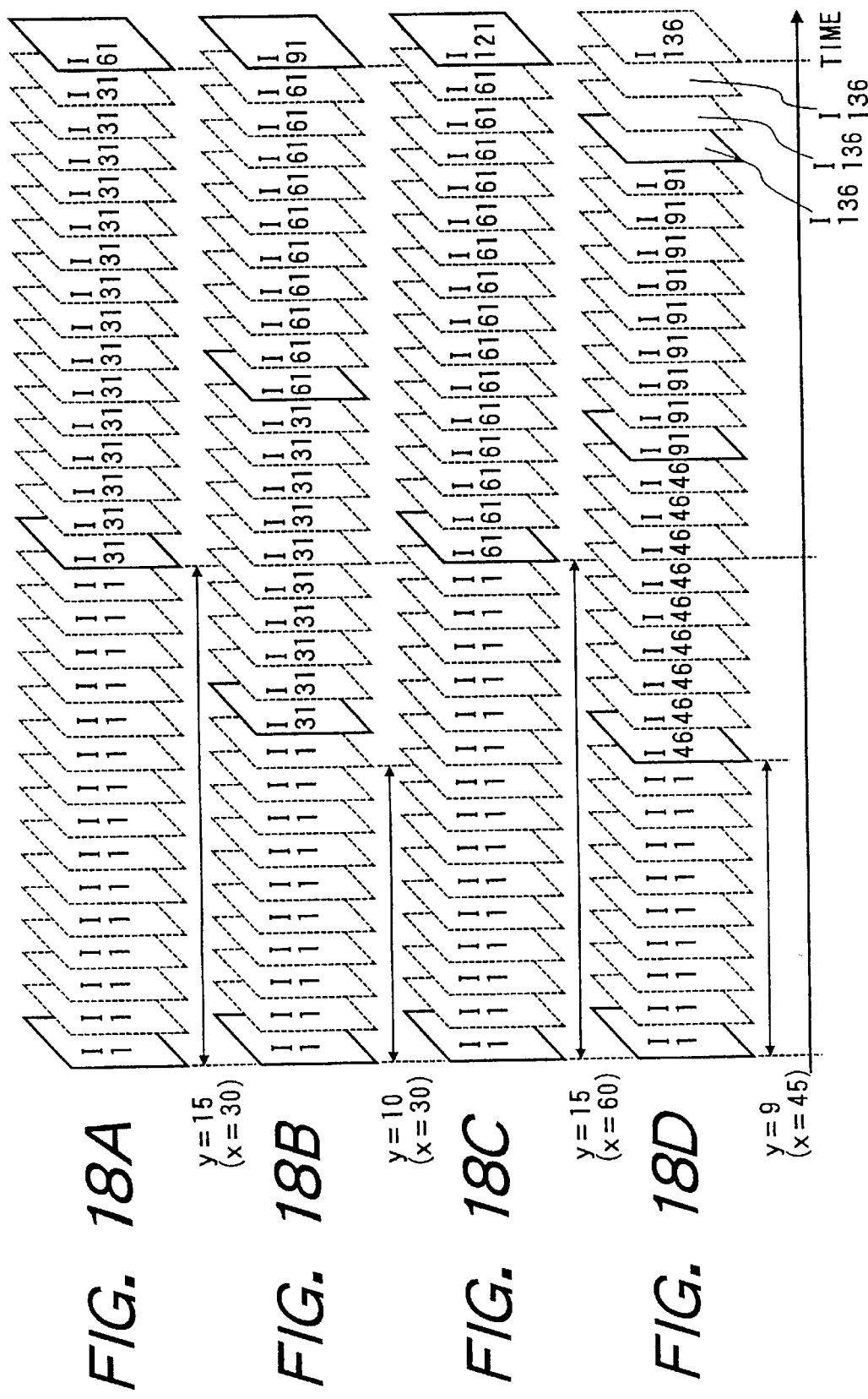
FIGS. 18A–18D illustrate playback frame sequences in the video-on-demand-system of the sixth embodiment.

In the case of a double-speed playback, as shown in FIG. 18A, the stream reading section 103 reads out one keyframe per 30 frames while being controlled by the stream control section 201; that is, frame numbers 1, 31, 61, . . . are read out. Read-out keyframes are transmitted to the terminal apparatus. A double-speed playback is effected such that under the control of the decoder control section 205, each keyframe is decoded 15-frames after display of the preceding keyframe as shown in FIG. 18A.

In the case of a triple-speed playback, as shown in FIG. 18B, the stream reading section 103 reads out one keyframe per 30 frames while being controlled by the stream control section 201; that is, frame numbers 1, 31, 61, . . . are read outs Read-out keyframes are transmitted to the terminal apparatus. A triple-speed playback is effected such that under the control of the decoder control section 205, each keyframe is decoded 10-frames after display of the preceding keyframe as shown in FIG. 18B.

FIGS. 18B–18D similarly show cases of quadruple-speed and 5-fold-speed playbacks, respectively.

According to the method of this embodiment, since a keyframe playback interval and a keyframe readout interval for realizing a playback speed designated by the terminal apparatus are set as short as possible, the motion of high-speed playback images becomes more smooth and the image quality is improved as much.

Embodiment 7

The third method for determining a keyframe playback interval and a keyframe readout interval that realize a designated playback speed multiplication factor is intended to cope with a playback request of a non-integral playback speed multiplication factor. In this method, a keyframe playback interval is determined for each keyframe received by the terminal apparatus.

The stream control section 201 of the video server apparatus calculates a minimum keyframe playback interval in the same manner as in the sixth embodiment. Where a non-integral number m is designated as a playback speed multiplication factor by the terminal apparatus, the stream control section 201 then sets, as a basic keyframe readout interval, a shortest one of keyframe readout intervals that satisfy an inequality (keyframe readout interval)/(multiplication factor m)>(minimum keyframe playback interval), that is, (keyframe readout interval)>(minimum keyframe playback interval)×(multiplication factor m).

Now, a keyframe that is played back nthly (n is a natural number) is called "playback keyframe (n)," and an interval between playback keyframe (n) and playback keyframe (n+1) is called "keyframe playback interval (n)." The number of frames in a stored stream from the head frame to a frame immediately before playback keyframe (n+1) is equal to (basic keyframe readout interval)×n. To obtain a playback speed multiplication factor that approximates the non-integral number m, the terminal apparatus may play back the above number of frames by setting, as a playback interval, an integer closest to (basic keyframe readout interval)×n÷(multiplication factor m). Therefore, keyframe playback interval (n) is equal to the integer closest to (basic keyframe readout interval)×n÷(multiplication factor m) minus an integer closest to (basic keyframe readout interval)×(n−1)÷(multiplication factor m) Keyframe playback interval (n) is a variable value.

An example of determining a keyframe readout interval and keyframe playback interval (n) will be described with reference to a playback speed table of FIG. 19, whose contents are the same as those of the table of FIG. 9. It is assumed that the minimum keyframe playback interval is 9 and the keyframe interval is 15. A keyframe readout interval is determined in the following manner when a playback speed multiplication factor 3.1 is designated by the terminal apparatus.

Keyframe playback intervals are calculated in order from one corresponding to the minimum keyframe readout interval. Since keyframe readout intervals are multiples of the keyframe interval, first a keyframe corresponding to the minimum keyframe readout interval of 15 is calculated as 15/3.1=4.83••, which is smaller than the minimum keyframe playback interval of 9. This value does not satisfy the inequality (keyframe readout interval)/(multiplication factor m)>(minimum keyframe playback interval).

Therefore, a keyframe playback interval corresponding to the second smallest keyframe readout interval of 30 is then calculated as 30/3.1=9.67••, which is larger than the minimum keyframe playback interval of 9. Thus, the keyframe readout interval of 30 is employed as a basic keyframe readout interval.

Next, keyframe playback interval (1) is calculated by subtracting an integer 0 that is closest to (basic keyframe readout interval 30)×(1−1)÷(multiplication factor 3.1)=0 from 10 that is obtained by rounding off 30/3.1=9.67•• to an integer. Thus, keyframe playback interval (1) is calculated as 10.

Keyframe playback interval (2) is calculated by subtracting an integer 10 that is obtained by rounding off 30×(2−1)÷3.1=9.67•• to an integer from 19 that is obtained by rounding off 30×2÷31=19.35•• to an integer. Thus, keyframe playback interval (2) is calculated as 9.

Similarly, keyframe playback interval (3) is calculated by subtracting an integer 10 that is obtained by rounding off 30×(3−1)÷3.1=19.35 to an integer from 29 that is obtained by rounding off 30×3÷3.1−29.03 to an integer. Thus, keyframe playback interval (3) is calculated as 10. Subsequent keyframe playback intervals can be calculated in order according to similar procedures. As is understood from the above examples, the keyframe playback interval varies for each playback keyframe.

Figure 20:
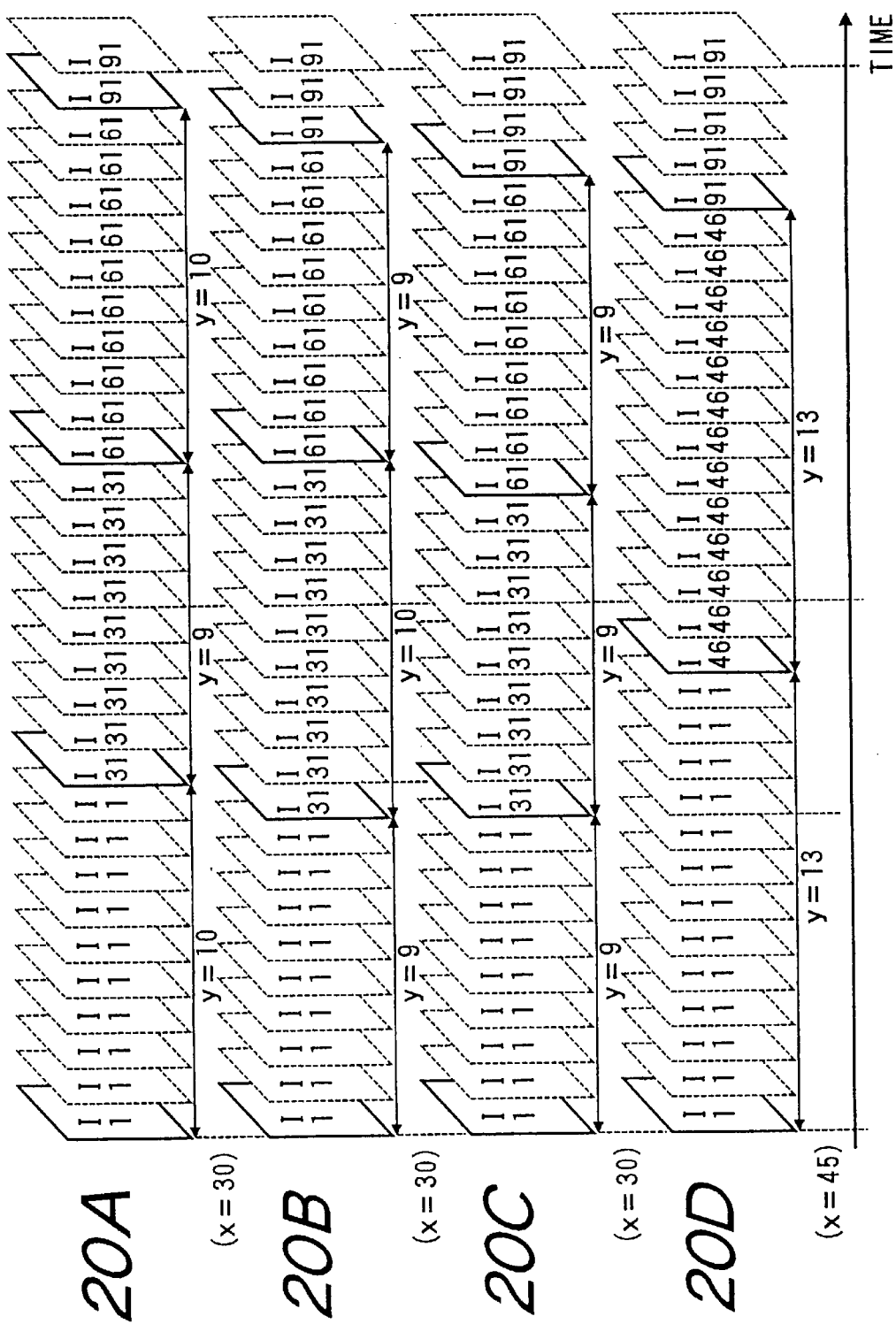
FIGS. 20A–20D illustrate playback frame sequences in the video-on-demand-system of the seventh embodiment.

When a 3.1-fold-speed playback is designated by the terminal apparatus, the stream reading section 103 reads out one keyframe per 30 keyframes as shown in FIG. 20A while being controlled by the stream control section 201; that is, frame numbers 1, 31, 61, . . . are read out. Read-out keyframes are transmitted to the terminal apparatus, and displayed at the determined keyframe playback intervals under the control of the decoder control section 205.

More specifically, after a decoded keyframe of frame number 1 is displayed, still display is effected for 9 frames and a keyframe of frame number 31 is displayed as an 11th display frame. Decoding of the keyframe of frame number 31 is completed by its display. After the display of the keyframe of frame number 31, still display is effected for 8 frames and a keyframe of frame number 61 is displayed as a 20th display frame. Decoding of the keyframe of frame number 61 is completed by its display. After the display of the keyframe of frame number 61, still display is effected for 9 frames and a keyframe of frame number 91 is displayed as a 30th display frame. Decoding of the keyframe of frame number 91 is completed by its display. A 3.1-fold-speed playback is realized as this type of playback processing is performed sequentially.

In the case of a 3.2-fold-speed playback, as shown in FIG. 20B, the stream reading section 103 reads out one keyframe per 30 keyframes; that is, frame numbers 1, 31, 61, . . . are read out. In the terminal apparatus, the decoder control section 205 controls the decoder section 112 to cause the following display sequence for the read-out keyframes: display of a keyframe of frame number 1, still display for 8 frames, display of a keyframe of frame number 31, still display of 9 frames, display of a keyframe of frame number 61, still display for 8 frames, . . . Thus, a 3.2-fold-speed playback is realized.

FIGS. 20C and 20D show playback fame sequences of 3.3-fold-speed and 3,4-fold-speed playbacks.

As described above, the method of this embodiment can realize a non-integral playback speed multiplication factor that is designated by the terminal apparatus. This method can also be used in constructing, for instance, a jog shuttle in which the playback speed is varied gradually.

Although in the fifth to seventh embodiments the keyframe interval is assumed to be 15, the invention is not limited to such a case. The keyframe interval may even be varied. The playback speed multiplication factor is not limited to the values used in the respective embodiments, but may be a negative value which means a backward high-speed playback. Although in the seventh embodiment a calculated number is rounded off to an integer in calculating keyframe playback interval (n), the invention is not limited to such a case. Further, although in the respective embodiments the still display of a playback keyframe is controlled by using the keyframe playback interval, it may be controlled by using the absolute frame number as counted from the playback start keyframe or some other keyframe.

Embodiment 8

An eighth embodiment of the invention is a modification of the video server apparatus and the terminal apparatus of the video-on-demand system according to the fourth embodiment.

Figure 21:
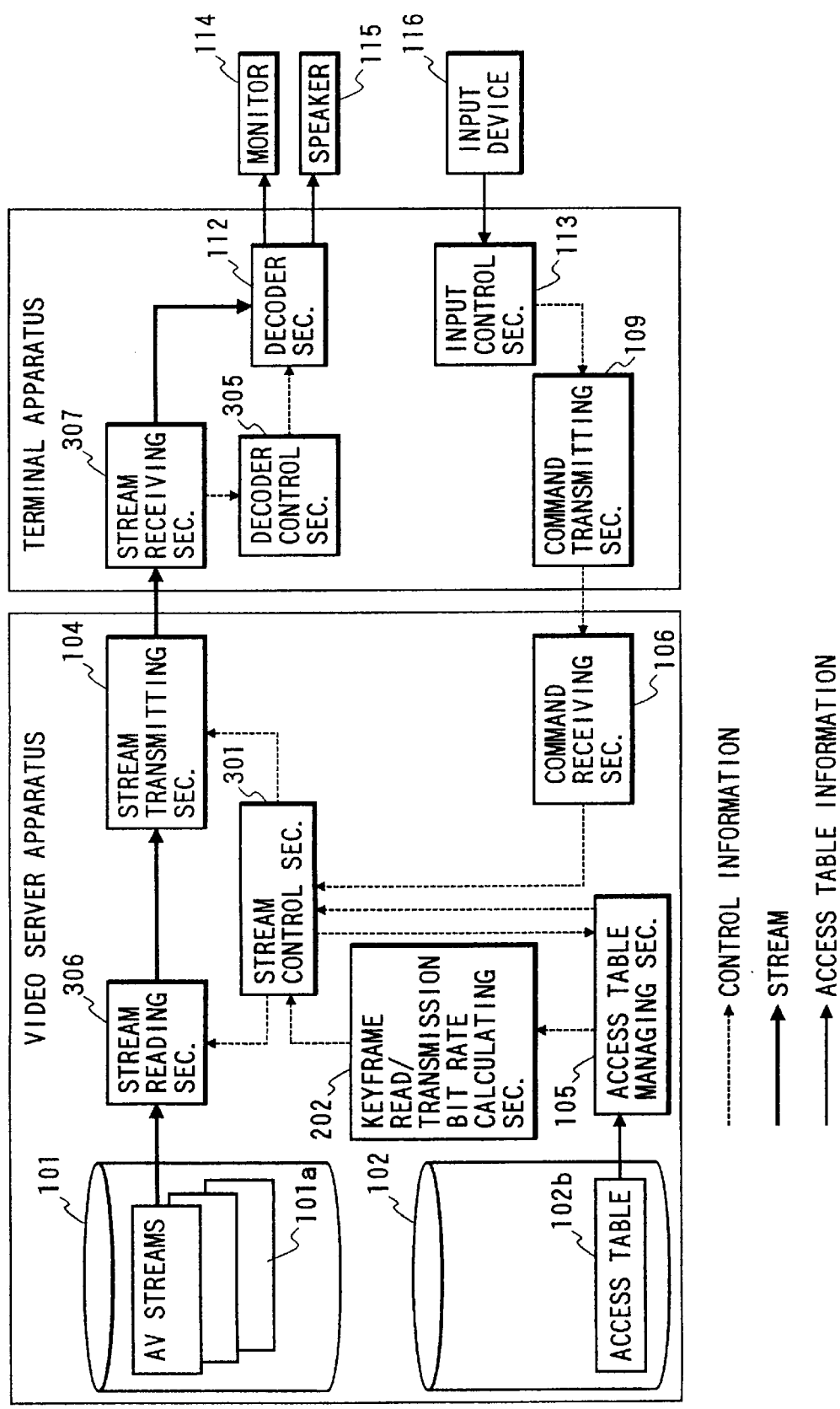
FIG. 21 is a block diagram showing a video-on-demand system according to an eighth embodiment of the invention.

In the video server apparatus of this system, as shown in FIG. 21, information of a keyframe playback interval that is set in the video server apparatus is buried into a stream and transmitted to the terminal apparatus together with the stream. Therefore, the control information transmitting section 203 and the control information receiving section 204 that are respectively provided in the video server apparatus and the terminal apparatus in the fourth embodiment (see FIG. 14) are not provided in this embodiment. The eighth embodiment is the same as the fourth embodiment in the other part of the configuration In this system, a signal that is input from the input device 116 is converted, by the input control section 113 of the terminal apparatus, into a program designation command and commands indicating a playback start position and a playback speed, which commands are transmitted from the command transmitting section 109 to the command receiving section 106 of the video server apparatus.

The stream control section 301 of the video server apparatus determines an AV stream to be read out, keyframes to be read out, and their storage locations based on the program information, the playback start position, and the playback speed that are received by the command receiving section 106, and keyframe information that is managed by the access table managing section 105. The stream control section 301 informs the stream reading section 306 of the determined information, and instructs the stream reading section 306 to read out the stream from the hard disk 101.

If the playback speed means a high-speed playback, a stream control section 301 determines a keyframe playback interval and a keyframe readout interval based on a keyframe read bit rate, a key frame transmission bit rate, and a keyframe average data length that are obtained from the keyframe read/transmission bit rate calculating section 202, a keyframe interval that is obtained from the access table managing section 105, and the playback speed designated by the terminal apparatus. The stream control section 301 informs the stream reading section 306 of the keyframe readout interval, the keyframe readout positions, the keyframe read bit rate, and the keyframe playback interval, and instructs the stream reading section 306 to read out the designated keyframes and to insert or bury the keyframe playback interval into the read-out stream.

The stream reading section 306 reads out the designated keyframes of the AV stream 101*a* at the designated read bit rate, and inserts or buries the keyframe playback interval into a stream that consists only of the read-out keyframes. The stream transmitting section 104 transmits the stream that is received from the stream reading section 306 to a stream receiving section 307 of the terminal apparatus.

In the terminal apparatus, a decoder control section 305 controls the stream decoding of the decoder section 112 based on the information of the keyframe playback interval that is extracted from the stream by the stream receiving section 307. The stream decoded by the decoder section 112 is output from the monitor 114 as images.

Even in the case where the keyframe playback interval varies for the same playback speed as in the case of the seventh embodiment, the decoder control section 305 of this terminal apparatus can easily control the decoder section 112 operating in accordance with the varying keyframe playback interval, thereby enabling fine playback speed control.

The operation of a normal playback is the same as in the conventional system.

As described above, the system of the eighth embodiment can easily cope with a case where the terminal apparatus requests a precise high-speed playback such as a playback of a non-integral playback speed multiplication factor. Thus, the system can realize a high-speed playback that satisfies a request from the terminal apparatus.

Embodiment 9

In a video-on-demand system according to a ninth embodiment of the invention, a keyframe playback interval and a keyframe readout interval are set on the terminal apparatus side.

Figure 22:
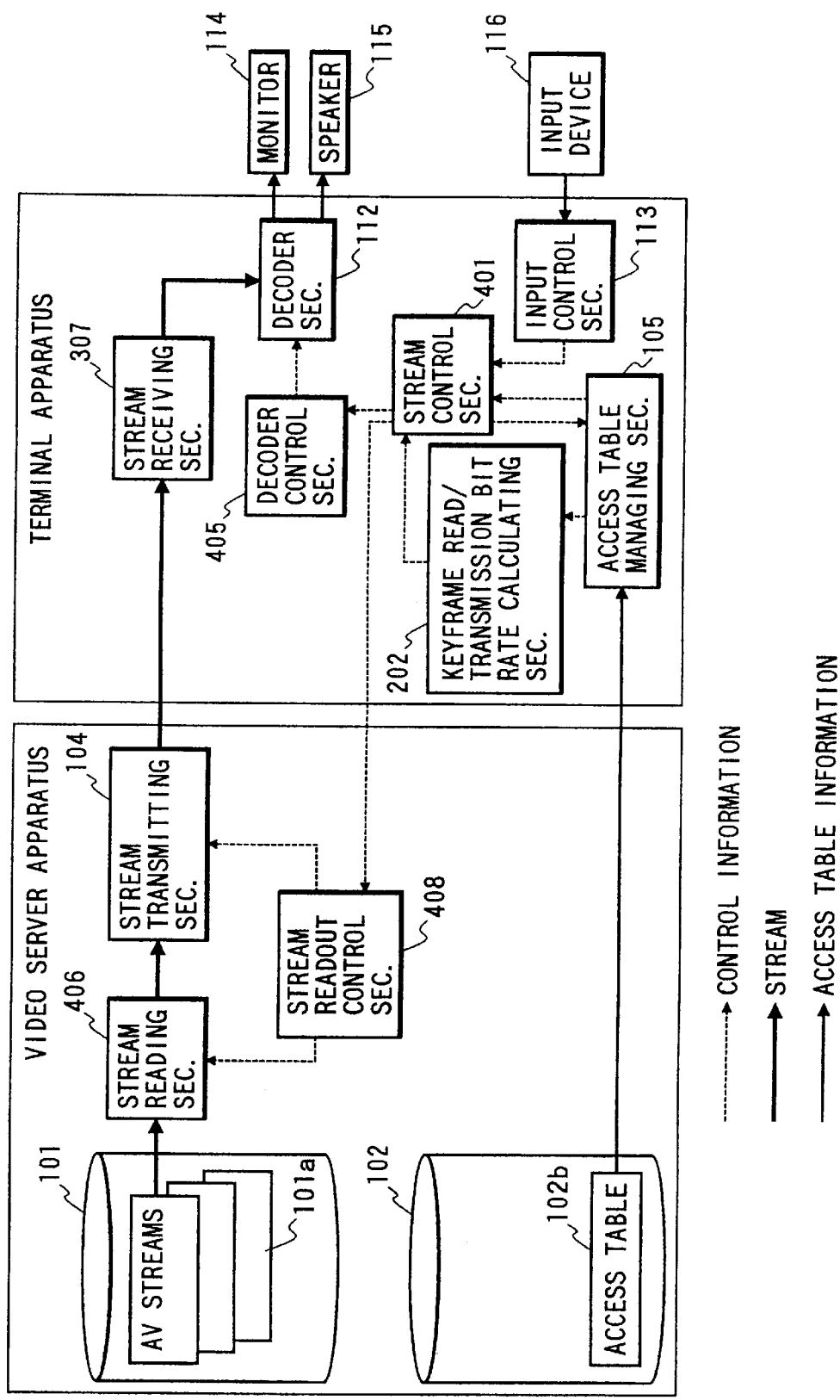
FIG. 22 is a block diagram showing a video-on-demand system according to a ninth embodiment of the invention.

As shown in FIG. 22, a video server apparatus of this system consists of a hard disk 101 for storing AV (audio-video) streams 101*a*, a hard disk 102 for storing an access table 102*b* to be used in accessing the AV streams 101*a,* a stream reading section 406 for reading out an AV stream 101*a* from the hard disk 101, a stream transmitting section 104 for transmitting the read-out AV stream to a terminal apparatus, and a stream readout control section 408 for controlling reading and transmission of the AV stream.

The terminal apparatus consists of an input control section 113 for generating a command in response to an input manipulation on an input device 116, an access table managing section 105 for reading out information of the access table 102*b* that is stored in the video server apparatus, a keyframe read/transmission bit rate calculating section 202 for calculating a keyframe read bit rate, a keyframe transmission bit rate, and a keyframe data length based on the information read out by the access table managing section 105, a stream control section 401 for determining a keyframe playback interval and a keyframe readout interval, a stream receiving section 407 for receiving an AV stream transmitted from the video server apparatus, a decoder section 112 for decoding the received AV stream, and a decoder control section 405 for controlling the decoder section 112. The input device 116 such as a keyboard or a mouse, a monitor 114 for displaying decoded images and a speaker 115 for outputting decoded sound are connected to the terminal apparatus.

The operation of the above-configured system will be described below.

A signal that is input from the input device 116 is converted, by the input control section 113 of the terminal apparatus, into a program designation information and information indicating a playback start position and a playback speed, which information is input to the stream control section 401. The stream control section 401 instructs, based on the playback start position of the designated program and the playback speed, the access table managing section 105 to acquire keyframe information corresponding to the designated program from the access table 102*b* that is stored in the video server apparatus.

Then, the stream control section 401 determines an AV stream to be read out, keyframes to be read out, and their storage locations based on the playback start position and the playback speed of the designated program, and the keyframe information held by the access table managing section 105. The stream control section 401 informs the stream readout control section 408 of the video server apparatus of the determined information, and instructs the stream readout control section 408 to read out the stream from the hard disk 101.

If the playback speed means a high-speed playback, the keyframe read/transmission bit rate calculating section 202 calculates a keyframe average data length based on data lengths of the respective keyframes of the AV stream that are obtained from the access table managing section 105, and also calculates a keyframe read bit rate and a keyframe transmission bit rate based on the keyframe average data length, a coding bit rate and other information.

The stream control section 401 determines a keyframe playback interval and a keyframe readout interval based on the keyframe average data length, the keyframe read bit rate, the key frame transmission bit rate, a keyframe interval that is obtained from the access table managing section 105, and the designated playback speed. The stream control section 401 informs the stream readout control section 408 of the video server apparatus of the keyframe readout interval, the keyframe readout positions, and the keyframe read bit rate. Further, the stream control section 401 informs the decoder control section 405 of the determined keyframe playback interval.

The stream readout control section 408 of the video server apparatus controls the stream reading section 406 so that it reads out the designated keyframes of the AV stream 101*a* at the designated read bit rate. A read-out stream is sent to the stream transmitting section 104, which transmits the received stream to the stream receiving section 407 of the terminal apparatus.

In the terminal apparatus, the decoder section 112 decodes the stream received by the stream receiving section 407. The decoder control section 405 controls the decoder section 112 so that the decoding is performed in accordance with the keyframe playback interval obtained from the stream control section 401. A video signal produced by the decoding of the decoder section 112 is output from the monitor 114 as images.

Even when the keyframe playback interval varies for the same playback speed, the decoder control section 405 of the terminal apparatus can control the decoding of the decoder section 112 while receiving the information of the keyframe playback interval directly from the stream control section 401. Therefore, this system can properly cope with frequent changes in keyframe playback interval.

As described above, in the system of this embodiment, the terminal apparatus is provided with the stream control section 401, the keyframe read/transmission bit rate calculating section 202, and the access table managing section 105. As a result, a keyframe playback interval can be designated on the terminal apparatus side, and hence fine control of a high-speed playback can be performed easily.

Although in the fourth to ninth embodiments a keyframe playback interval and other parameters are calculated by using a keyframe average data length, they may be calculated by using a keyframe maximum data length instead of the keyframe average data length. Although in those embodiments the AV streams 101*a* and the access table 102*b* are stored in the separate hard disks 101 and 102, it is apparent that they may be stored in the same storage medium. Instead of the AV streams 101*a*, the subject streams may be video streams, audio streams, or some other type of streams. Although the MPEG scheme is used to compress moving images, the invention is not limited to such a case. Further, the terminal apparatus may be adapted to decode audio data to allow sound output from the speaker even in a high-speed playback.

The connection between the video server apparatus and the terminal apparatus may take a variety of form For example, a plurality of terminal apparatuses may be connected to a single video server apparatus, a plurality of terminal apparatuses may be connected to a plurality of video server apparatuses, or a single terminal apparatus may be connected to a single video server apparatus.

In the eighth embodiment, a keyframe playback interval may be inserted or buried into a bit stream such that it is converted into time information indicating time points at which subject keyframes are decoded and played back and the time information is described in DTS (decoding time stamp) fields and PTS (presentation time stamp) fields that are specified in the international standards MPEG1 (moving picture coding experts group phase 1) and MPEG2 (moving picture coding experts group phase 2). Alternatively, it may be inserted or buried as time information in a manner not specified in MPEG1 or MPEG2. Further, in the eighth embodiment, a playback mode may also be inserted or buried into a stream as in the case of the fourth embodiment.

What is claimed is:

1. A video server apparatus comprising stream storage means for storing compressed and coded streams;

stream reading means for reading out one of the streams which is designated by a terminal apparatus;

stream transmitting means for transmitting the read-out stream to the terminal apparatus;

access table managing means for managing addresses of keyframes of the stream;

keyframe data length calculating means for acquiring data lengths of the keyframes;

stream readout position determining means for determining a first keyframe located in the vicinity of a playback start position that is designated by the terminal apparatus based on the addresses managed by the access table managing means, selecting keyframes which satisfy an arbitrary playback speed that is designated by the terminal apparatus, and informing the stream reading means of readout positions of the first keyframe and the selected keyframes; and stream transmission timing setting means for controlling a transmission bit rate of the stream transmitting means and a read bit rate of the stream reading means so that the selected keyframes are transmitted at a constant interval, based on the keyframe data lengths acquired by the keyframe data length calculating means.

\* \* \* \* \*

UNITED STATES PATENT AND TRADEMARK OFFICE
CERTIFICATE OF CORRECTION

PATENT NO. : 5,903,263
DATED : May 11, 1999
INVENTOR(S) : Emura

It is certified that error appears in the above-identified patent and that said Letters Patent is hereby corrected as shown below:

On the Title Page, item [56], References Cited, U.S. PATENT DOCUMENTS, 3rd Reference, delete "Erunta and insert --Erunra--.

Column 21, Line 12, delete "483··" and insert --4.83··--.

Column 21, Line 36, delete "29.03" and insert -- =·29.03··--.

Signed and Sealed this

Twelfth Day of October, 1999

Attest:

Q. TODD DICKINSON

*Attesting Officer*    *Acting Commissioner of Patents and Trademarks*